United States Patent
Sasaki et al.

(10) Patent No.: US 6,956,067 B2
(45) Date of Patent: Oct. 18, 2005

(54) EXPANDED POLYPROPYLENE RESIN BEAD AND PROCESS OF PRODUCING SAME

(75) Inventors: Hidehiro Sasaki, Tochigi-ken (JP); Akinobu Hira, Kanuma (JP); Keiichi Hashimoto, Utsunomiya (JP); Hisao Tokoro, Utsunomiya (JP)

(73) Assignee: JSP Corporation (JP)

(*) Notice: Subject to any disclaimer, the term of this patent is extended or adjusted under 35 U.S.C. 154(b) by 97 days.

(21) Appl. No.: 10/379,569

(22) Filed: Mar. 6, 2003

(65) Prior Publication Data

US 2003/0162012 A1 Aug. 28, 2003

Related U.S. Application Data

(63) Continuation-in-part of application No. 10/312,764, filed as application No. PCT/JP01/08187 on Sep. 20, 2001, now abandoned.

(30) Foreign Application Priority Data

Sep. 20, 2000 (JP) .................................... 2000-285648

(51) Int. Cl.[7] .................................................. C08J 9/16
(52) U.S. Cl. .............................. 521/56; 264/50; 264/53; 521/57
(58) Field of Search .................... 521/56, 57; 264/50, 264/53

(56) References Cited

U.S. PATENT DOCUMENTS

| | | | |
|---|---|---|---|
| 3,886,100 A | * 5/1975 | Yasuda et al. ................. | 521/57 |
| 3,953,558 A | 4/1976 | Hatano et al. ................. | 264/22 |
| 4,379,859 A | 4/1983 | Hirosawa et al. ............. | 521/59 |
| 4,440,703 A | 4/1984 | Akiyama et al. ............. | 264/50 |
| 4,464,484 A | 8/1984 | Yoshimura et al. ........... | 521/58 |
| 4,602,082 A | 7/1986 | Akiyama et al. ........... | 528/481 |
| 4,617,323 A | 10/1986 | Kuwabara et al. ............ | 521/60 |
| 4,695,593 A | 9/1987 | Kuwabara et al. ............ | 521/60 |
| 4,704,239 A | 11/1987 | Yoshimura et al. .......... | 264/50 |
| 4,711,287 A | 12/1987 | Kuwabara et al. ............ | 164/34 |
| 4,777,000 A | 10/1988 | Kuwabara et al. ............ | 264/51 |
| 4,840,973 A | 6/1989 | Kuwabara et al. ............ | 521/58 |
| 5,032,620 A | 7/1991 | Arai et al. .................... | 521/60 |
| 5,468,781 A | 11/1995 | Sugano et al. ................ | 521/60 |
| 5,716,998 A | 2/1998 | Munakata et al. ............ | 521/58 |
| 5,747,549 A | 5/1998 | Tsurugai et al. .............. | 521/60 |
| 6,034,144 A | 3/2000 | Shioya et al. ................. | 521/60 |
| 6,051,617 A | 4/2000 | Sasaki et al. ................. | 521/59 |
| 6,077,875 A | 6/2000 | Sasaki et al. ................. | 521/60 |
| 6,313,184 B1 | 11/2001 | Sasaki et al. ................. | 521/56 |
| 6,355,696 B1 | 3/2002 | Yamaguchi et al. .......... | 521/56 |
| 6,451,419 B1 | 9/2002 | Tsurugai et al. ........... | 428/304.4 |

FOREIGN PATENT DOCUMENTS

| | | |
|---|---|---|
| JP | 03-152136 | 6/1991 |
| JP | 10-45938 | 2/1998 |
| JP | 11-080262 | 3/1999 |
| JP | 11-156879 | 6/1999 |
| JP | 2886248 | 12/1999 |

* cited by examiner

*Primary Examiner*—Allan R. Kuhns
(74) *Attorney, Agent, or Firm*—Lorusso & Loud

(57) ABSTRACT

Expanded, substantially non-crosslinked polypropylene resin beads capable of producing a high rigidity foamed molding at a relatively low temperature. The beads are produced by a process including a step of dispersing substantially non-crosslinked polypropylene resin particles in a dispersing medium containing an organic peroxide to obtain a dispersion, a step of heating the dispersion to decompose the organic peroxide and to modify the surface of the surface-modified polypropylene resin particles, and a step of expanding the non-crosslinked, surface-modified polypropylene resin particles using a blowing agent.

42 Claims, 5 Drawing Sheets

EXPANDED POLYPROPYLENE RESIN BEAD AND PROCESS OF PRODUCING SAME

CROSS-REFERENCE TO RELATED APPLICATIONS

This application is a continuation-in-part of copending U.S. patent application Ser. No. 10/312,764, filed Dec. 30, 2002, which is the U.S. national phase of PCT International Application PCT/JP01/08187, filed on Sep. 20, 2001 under 35 U.S.C. section 371. The entire disclosure of each of the above-identified applications is hereby incorporated by reference.

PRIORITY CLAIM

This application claims the priority under 35 U.S.C. section 119 of Japanese Patent Application No. 2000-285648, filed on Sep. 20, 2000, the entire disclosure of which is hereby incorporated by reference herein.

BACKGROUND OF THE INVENTION

1. Field of the Invention

This invention relates to expanded polypropylene resin beads and a process of producing same. The present invention also pertains to a molded article obtained from the expanded polypropylene resin beads.

2. Description of Prior Art

A polypropylene resin is now increasingly utilized in various fields because of excellent mechanical strengths, heat resistance, machinability, cost balance, combustibility and recyclability thereof. Foamed, non-crosslinked resin moldings of a base resin including a polypropylene resin (hereinafter referred to simply as "PP moldings"), which retain the above excellent properties and which have excellent additional characteristics such as cushioning property and heat resistance, are thus utilized for various applications as packaging materials, construction materials, heat insulation materials, etc.

Recently, there is an increasing demand for PP moldings having higher rigidity and lighter weight than the conventional ones. For example, in the field of vehicles such as automobiles, PP moldings have been used in various parts such as bumper cores, door pats, pillars, tool boxes and floor mats. In view of protection of environment and saving of energy, light weight and high rigidity PP moldings retaining excellent cushioning and shock absorbing properties are desired. In the field of containers and boxes for storing and transporting foods such as fish, molded polystyrene foams have been hitherto used. Because of inferior shock and heat resistance, however, molded polystyrene foams are not suitably reused. Therefore, the need for light weight and high rigidity PP moldings is also increasing in this field.

One known method for improving rigidity of PP moldings produced by molding expanded, substantially non-crosslinked resin beads of a base resin including a polypropylene resin (hereinafter referred to as "expanded PP beads") in a mold is to use a high rigidity polypropylene resin as a raw material (e.g. U.S. Pat. No. 5,747,549). Thus, a propylene homopolymer or a propylene copolymer containing a reduced content of a comonomer such as butene or ethylene has been used. Such a high rigidity polypropylene resin, however, has a high melting point and requires a high temperature for molding. When steam is used for molding, it is necessary to use high pressure steam and, therefore, to use a special molding device having a high pressure resistance, in order to attain sufficient melt adhesion between the expanded PP beads.

Another known method for improving rigidity of PP moldings is to use expanded PP beads which show, in a DSC curve thereof, a high temperature peak of a large area in addition to an intrinsic peak which is present in a lower temperature side of the high temperature peak and is inherent to the polypropylene resin (e.g. JP-B-2886248 and JP-A-H11-156879). In this case, too, it is necessary to use high pressure steam and, therefore, to use a special molding device having a high pressure resistance, in order to attain sufficient melt adhesion between the expanded PP beads.

SUMMARY OF THE INVENTION

It is an object of the present invention to provide expanded, substantially non-crosslinked PP beads which can form a PP molding having high rigidity and high adhesion between beads using steam at a relatively low temperature.

Another object of the present invention is to provide a process which can produce the above expanded PP beads.

In accomplishing the foregoing objects, there is provided in accordance with one aspect of the present invention a process for the preparation of expanded resin beads, comprising the steps of:

(a) dispersing substantially non-crosslinked particles of a base resin including a polypropylene in a dispersing medium containing an organic peroxide to obtain a dispersion;

(b) maintaining said dispersion at a temperature lower than the melting point of said base resin but sufficient to decompose said organic peroxide, thereby obtaining substantially non-crosslinked, surface-modified resin particles; and (c) expanding said non-crosslinked, surface-modified resin particles using a blowing agent to obtain expanded, substantially non-crosslinked resin beads.

In another aspect, the present invention provides an expanded, substantially non-crosslinked resin bead of a base resin including a polypropylene resin, said bead meets one of the following conditions (I) through (III):

(I) said bead has a surface region and an inside region which satisfy at least one of the following conditions (a) and (b), (a) each of said surface and inside regions shows a high temperature endothermic peak, in a DSC curve thereof, in addition to an intrinsic endothermic peak located at a lower temperature side of said high temperature peak, wherein said high temperature endothermic peaks of said surface region and said inside region have such areas that correspond to calorific values of Hs and Hi, respectively, and wherein Hs and Hi have the following relationship:

$$Hs < 0.86 \times Hi;$$

(b) said surface region has a greater oxygen content per unit weight than that of said inside region.

(II) said bead shows a high temperature endothermic peak, in a DSC curve thereof, in addition to an intrinsic endothermic peak located at a lower temperature side of said high temperature peak, said bead having a surface having a melt initiation temperature, by micro differential thermoanalysis, not higher than the melting point of the base resin;

(III) said bead exhibits a high temperature endothermic peak, in a DSC curve thereof, in addition to an intrinsic endothermic peak located at a lower temperature side of said high temperature peak, said expanded bead having a surface having an extrapolated melt initiation temperature, as measured by micro differential thermoanalysis, not higher than (Tm+4° C.) where Tm is the melting point of the base resin.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
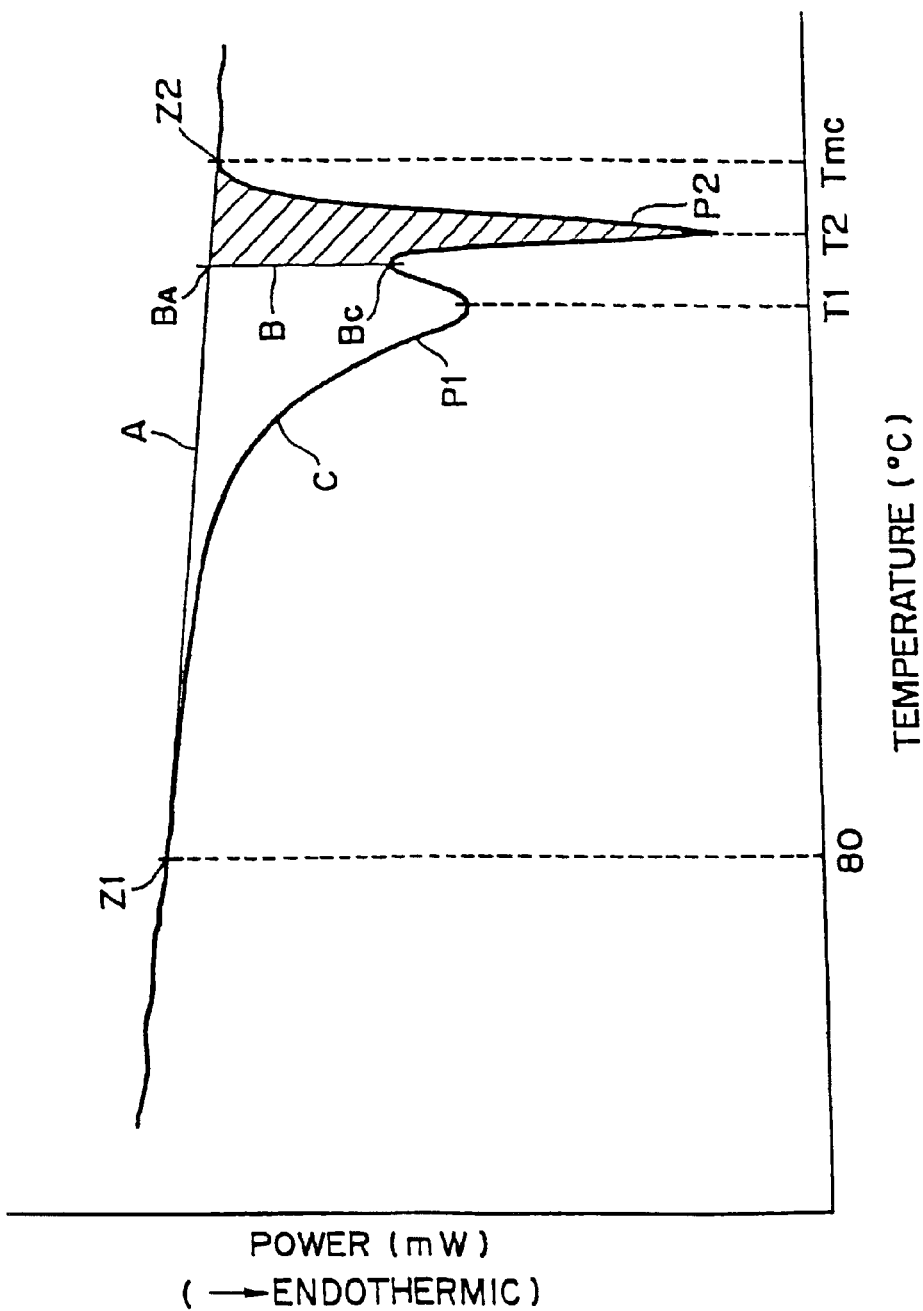
FIG. 1 is an initial DSC curve of expanded polypropylene beads.

The expanded PP beads according to the present invention are prepared by expanding substantially non-crosslinked resin particles of a base resin including a polypropylene resin. The term "polypropylene resin" as used herein refers to (1) polypropylene homopolymer, (2) a copolymer of propylene and one or more comonomers having a propylene content of at least 60 mole %, a mixture of two or more of the copolymers (2), or a mixture of the homopolymer (1) and the copolymer (2).

The copolymer may be, for example, ethylene-propylene block copolymers, ethylene-propylene random copolymers, propylene-butene random copolymers or ethylene-propylene-butene random copolymers.

The base resin containing the polypropylene resin as essential component preferably has a melting point of at least 130° C., more preferably at least 135° C., still more preferably at least 145° C., most preferably 158–170° C., for reasons of suitable physical properties of PP molding. For reasons of heat resistance of PP molding and expansion efficiency in producing expanded particles, the base resin preferably has a melt flow rate (MFR) of 0.3–100 g/10 min, more preferably 1–90 g/10 min. The MFR herein is as measured in accordance with the Japanese Industrial Standard JIS K7210-1976, Test Condition 14.

If desired, the base resin may contain one or more additional resins or one or more elastomers. The amount of the additional resin or elastomer in the base resin is preferably no more than 35 parts by weight, more preferably no more than 25 parts by weight, still more preferably no more than 15 parts by weight, most preferably no more than 10 parts by weight, per 100 parts by weight of the polypropylene resin. Examples of the additional resins include polyethylene resins such as high density polyethylenes, medium density polyethylenes, low density polyethylenes, linear low density polyethylenes, linear very low density polyethylenes, ethylene-vinyl acetate copolymers, ethylene-acrylic acid copolymers, ethylene-methacrylic copolymers; and polystyrene resins such as polystyrene and styrene-maleic anhydride copolymers. Examples of elastomers include ethylene-propylene rubber, ethylene-1-butene rubber, propylene-1-butene rubber, styrene-butadiene rubber, isoprene rubber, neoprene rubber, nitrile rubber, styrene-butadiene block copolymers and hydrogenated products of the above rubbers and copolymers.

The base resin may also be blended with one or more additives such as an antioxidant, a UV absorbing agent, a foam controlling agent, a sterically hindered amine compound, an antistatic agent, a fire retardant, a metal-deactivator, a pigment, a nucleus agent, a filler, a stabilizer, a reinforcing material and a lubricant. The foam controlling agent may be, for example, an inorganic powder such as zinc borate, talc, calcium carbonate, borax or aluminum hydroxide.

The additive or additives are generally used in an amount of 20 parts by weight or less, preferably 10 parts by weight or less, more preferably 0.005–5 parts by weight, per 100 parts by weight of the base resin.

The resin particles used as a raw material for the production expanded PP beads according to the present invention may be obtained by any suitable known method. For example, the above-described base resin, which is generally in the form of pellets, and, if desired, one or more additives are charged, mixed and kneaded in an extruder. The kneaded mass is then extruded through a die into strands and cut to obtain the resin particles. It is preferred that the strands be quenched immediately after being extruded for reasons that the succeeding surface modification with an organic peroxide, which will be described hereinafter, may be efficiently performed. The quenching may be carried out by introducing the strands in water at 50° C. or less, preferably 40° C. or less, more preferably 30° C. or less. The cooled strands are taken out of the water and cut into particles each having a length/diameter ratio of 0.5–2.0, preferably 0.8–1.3, and a mean weight of 0.1–20 mg, preferably 0.2–10 mg. The mean weight is an average of 200 arbitrarily selected particles.

The resin particles are dispersed in a dispersing medium containing an organic peroxide to obtain a dispersion. Any dispersing medium may be used as long as it can disperse the resin particles therein without substantially dissolving components of the particles. Examples of the dispersing medium include water, ethylene glycol, glycerin, methanol, ethanol or a mixture of them. An aqueous dispersion medium, preferably water, more preferably ion-exchanged water, is suitably used.

The dispersion is heated at a temperature lower than the melting point of the base resin but sufficient to decompose the organic peroxide, thereby obtaining substantially non-crosslinked, surface-modified resin particles. The non-crosslinked, surface-modified resin particles are then expanded using a blowing agent to obtain expanded PP beads. The expanded PP beads have excellent fuse-bonding properties and give a high rigidity PP molding in a mold using steam at a relatively low temperature.

Any organic peroxide may be used for the purpose of the present invention as long as it decomposes when heated at a temperature lower than the melting point of the base resin.

Illustrative of suitable organic peroxides are shown below together with 1 Hr half life temperature Th and 1 min half life temperature Tn thereof, which are indicated in the brackets on the left and right sides, respectively, of the slash (/) and which will be discussed hereinafter:

Isobutylperoxide [50° C./85° C.],
Cumyl peroxy neodecanoate [55° C./94° C.],
α, α'-Bis(neodecanoylperoxy)diisopropylbenzene [54° C./82° C.],
di-n-Propyl peroxydicarbonate [58° C./94° C.],
Diisopropyl peroxydicarbonate [56° C./88° C.],
1-Cyclohexyl-1-methylethyl peroxy neodecanoate [59° C./94° C.],
1,1,3,3-Tetramethylbutyl peroxy neodecanoate [58° C./92° C.],
Bis(4-t-butylcyclohexyl) peroxydicarbonate [58° C./92° C.],
Di-2-ethoxyethyl peroxydicarbonate [59° C./92° C.],
Di(2-ethylhexylperoxy)dicarbonate [59° C./91° C.],
t-Hexyl peroxy neodecanoate [63° C./101° C.],
Dimethoxybutyl peroxydicarbonate [64° C./102° C.],
Di(3-methyl-3-methoxybutylperoxy)dicarbonate [65° C./103° C.],
t-Butyl peroxy neodecanoate [65° C./104° C.],
2,4-Dichlorobenzoyl peroxide [74° C./119° C.],
t-Hexyl peroxy pivalate [71° C./109° C.],
t-Butyl peroxy pivalate [73° C./110° C.],
3,5,5-Trimethylhexanoyl peroxide [77° C./113° C.],
Octanoyl peroxide [80° C./117° C.],
Lauroyl peroxide [80° C./116° C.],
Stearoyl peroxide [80° C./117° C.],
1,1,3,3-Tetramethylbutyl peroxy 2-ethylhexanoate [84° C./124° C.],
Succinic peroxide [87° C./132° C.],
2,5-Dimethyl-2,5-di(2-ethylhexanoylperoxy)hexane [83° C./119° C.],
1-Cyclohexyl-1-methylethyl peroxy 2-ethylhexanoate [90° C./138° C.],
t-Hexyl peroxy 2-ethylhexanoate [90° C./133° C.],
t-Butyl peroxy 2-ethylhexanoate [92° C./134° C.],
m-Toluoyl benzoyl peroxide [92° C./131° C.],
Benzoyl peroxide [92° C./130° C.],
t-Butyl peroxy isobutylate [96° C./136° C.],
1,1-Bis(t-butylperoxy)-2-methylcyclohexane [102° C./142° C.],
1,1-Bis(t-hexylperoxy)-3,3,5-trimethylcyclohexane [106° C./147° C.],
1,1-Bis(t-butylperoxy)-3,3,5-trimethylcyclohexane [109° C./149° C.],
1,1-Bis(t-hexylperoxy)cyclohexane [107° C./149° C.],
1,1-Bis(t-butylperoxy)cyclohexane [111° C./154° C.],
2,2-Bis(4,4-dibutylperoxycyclohexyl)propane [114° C./154° C.],
1,1-Bis(t-butylperoxy)cyclododecane [114° C./153° C.],
t-Hexyl peroxy isopropyl monocarbonate [115° C./155° C.],
t-Butyl peroxy maleic acid [119° C./168° C.],
t-Butyl peroxy 3,5,5-trimethylhexanoate [119° C./166° C.],
t-Butyl peroxy laurate [118° C./159° C.],
2,5-Dimethyl-2,5-di(m-toluoylperoxy)hexane [117° C./156° C.],
t-Butyl peroxy isopropyl monocarbonate [118° C./159° C.],
t-Butyl peroxy 2-ethylhexyl monocarbonate [119° C./161° C.],
t-Hexyl peroxy benzoate [119° C./160° C.], and
2,5-Dimethyl-2,5-di(benzoylperoxy)hexane [119° C./158° C.].

These organic peroxides may be used alone or in combination. The amount of the organic peroxide in the dispersion is generally 0.01–10 parts by weight, preferably 0.05–5 parts by weight, more preferably 0.1–3 parts by weight, per 100 parts by weight of the resin particles.

In the dispersion obtained by dispersing the resin particles in a dispersing medium containing an organic peroxide, it is preferred that the weight ratio of the resin particles to the dispersing medium be 1.3:1 or less, more preferably 1.2:1 or less, much more preferably 1.1:1 or less, most preferably 1:1 or less, for reasons of uniformly treating the particles with the organic peroxide. Namely, when the weight ratio of the resin particles to the dispersing medium is excessively high, a difficulty might be caused in uniformly treating the surfaces of the resin particles. Thus, a part of the resin particles which excessively undergo the surface modification tend to for an aggregate in the dispersion so that the discharge of the dispersion from the vessel at the time of the expansion is not smoothly carried out. From the standpoint of economy, the weight ratio of the resin particles to the dispersing medium is desirably at least 0.6:1, more preferably at least 0.7:1.

An organic peroxide, when heated, decomposes and generates radicals which causes three types of chain transfer reactions, namely hydrogen extraction, addition and β-degradation. In the case of the present invention, the use of an organic peroxide capable of generating radicals causing addition reactions, especially oxygen radicals, is preferred. A carbonate-type organic peroxide is preferred for this reason. The oxygen radicals may be organic oxy-radical (RO. where R is an organic group derived from the organic peroxide) as well as O-radical (O.). If desired, a chain transfer agent may be added to the polypropylene resin particles-containing dispersion or previously incorporated into the resin particles.

Hitherto, the following methods are known to use an organic peroxide in connection with a polypropylene resin:

(1) A method in which polypropylene resin particles are uniformly impregnated with an organic peroxide and a crosslinking aid, the resulting resin particles being subsequently heated at a temperature higher than the melting point of the polypropylene resin to decompose the organic peroxide and to crosslink the polypropylene resin;

(2) A method in which a composition containing polypropylene and an organic peroxide is kneaded in an extruder to decompose the organic peroxide and to decompose the polypropylene, thereby obtaining polypropylene having a narrower molecular weight distribution (JP-A-H03-152136);

(3) A method in which polypropylene particles are uniformly impregnated with an organic peroxide and a crosslinking aid, the resulting resin particles being subsequently heated at a temperature lower than the melting point of the polypropylene to decompose the organic peroxide and to introduce a long chain branch or crosslinking structure into the polypropylene resin. The polypropylene resin particles thus having an improved melt tension is kneaded with a blowing agent in an extruder and extruded (JP-A-H11-80262);

(4) A method in which a polypropylene resin is mixed and kneaded with an organic peroxide and maleic anhydride in an extruder at a temperature higher than the melting point of the polypropylene resin to graft polymerize the maleic anhydride on the polypropylene resin.

The method of the present invention in which a dispersion containing the resin particles and an organic peroxide is maintained at a temperature lower than the melting point of the base resin but sufficient to decompose the organic peroxide, thereby obtaining substantially non-crosslinked, surface-modified resin particles is thus distinct from the above known methods (1)–(4).

In the present invention, the organic peroxide is heated at a temperature lower than the melting point of the base resin but sufficient to substantially decompose the organic peroxide. It is preferred that 1 Hr half life temperature Th (the temperature at which the amount of the organic peroxide decreases to half when the peroxide is heated at that temperature for 1 hour) of the organic peroxide be not higher than the Vicat softening point of the base resin. The "Vicat softening point" in the present specification is in accordance with Japanese Industrial Standard JIS K 6747-1981. When the 1 Hr half life temperature Th is higher than the Vicat softening point of the polypropylene resin, it is difficult to substantially decompose the organic peroxide at a temperature lower than the melting point of the base resin. When the decomposition of the organic peroxide is carried out at a temperature not lower than the melting point of the base resin, the decomposed organic peroxide will attack not only the surfaces of the resin particles but also inside regions thereof, so that expanded PP beads obtained cannot give a desired PP molding.

Thus, it is preferred that the 1 Hr half life temperature Th be lower by at least 20° C., more preferably by at least 30° C., than the Vicat softening point of the base resin. It is also preferred that the 1 Hr half life temperature Th be in the range of 40–100° C., more preferably 50–90° C., for reasons of easiness of handling.

The organic peroxide in the dispersion is desirably substantially decomposed at a temperature not higher than, more preferably lower by at least 20° C. than, most preferably lower by at least 30° C. than, the Vicat softening point of the base resin. Further, the organic peroxide in the dispersion is desirably substantially decomposed at a temperature not lower than the glass transition point of the base resin, more preferably at a temperature in the range of 40–100° C., most preferably 50–90° C., for reasons of easiness in handling of the peroxide.

It is further preferred that the decomposition of the organic peroxide be performed by maintaining the organic peroxide at a temperature in the range of (Tn−30° C.) to (Tn+30° C.) for at least 10 minutes, where Tn is 1 min half life temperature of the organic peroxide (the temperature at which the amount of the organic peroxide decreases to half when the peroxide is heated at that temperature for 1 minute) for reasons of decomposition efficiency. When the decomposition is carried out at a temperature lower than (Tn−30° C.), a long time is required for completing the decomposition. Too high a decomposition temperature in excess of (Tn+30° C.) might adversely affect the uniformity of surface treatment. From the standpoint of process cost and efficiency, the heat treatment at a temperature of (Tn−30° C.) to (Tn+30° C.) is desired to be performed for 60 minutes or shorter. Preferably, the dispersion of the resin particles in the organic peroxide-containing liquid medium is prepared at such a temperature that the peroxide is prevented from decomposing and, then, the temperature is increased continuously or stepwise so that the peroxide is maintained at a temperature range of (Tn−30° C.) to (Tn+30° C.) for at least 10 minutes. In this case, it is preferred that the peroxide be maintained at a constant temperature of (Tn−5° C.) to (Tn+5° C.) for at least 5 minutes.

The term "substantially decompose" as used herein means that the active oxygen content of the peroxide is reduced to less than 50% of the original value. Preferably, the peroxide is decomposed so that the active oxygen content thereof be reduced to 30% or less, more preferably 20% or less, most preferably 5% or less of the original value.

The "1 hour half life temperature Th" and "1 min half life temperature Tn" of the organic peroxide are measured as follows. A sample peroxide is dissolved in a suitable solvent inert to radicals, such as benzene or mineral spirit, to obtain a solution having a peroxide concentration of 0.1 mol/L or 0.05 mol/L. This is placed in a glass tube whose inside space has been substituted by nitrogen. The glass tube is sealed and immersed in a constant temperature bath maintained at a predetermined temperature for a given period (1 minute or 1 hour) to permit the peroxide to decompose. The change in concentration of the organic peroxide with the time is measured. Under the above reaction conditions, since the decomposition reaction of the organic peroxide can be regarded as being a first-order reaction, the following equations can be formed:

$$dx/dt = k(a-x)$$

$$\ln[a/(a-x)] = kt$$

wherein x denotes a concentration of the organic peroxide, a denotes the initial concentration of the organic peroxide, k denotes the decomposition rate constant, and t denotes a time. Since the half-life period $t_{1/2}$ is a time required for reducing the concentration of the organic peroxide to half by decomposition (x=a/2), the following relationship is obtained:

$$kt_{1/2} = \ln 2.$$

From the above measurement of the change in concentration of the organic peroxide with the time (t), relationship between the time (t) and $\ln[a/(a-x)]$ is plotted to give a straight line. The gradient represents the constant (k) Thus, the half life $t_{1/2}$ is calculated from the above equation. The 1 Hr half life temperature and 1 min half life temperature of an organic peroxide are the temperatures at which $t_{1/2}$ of the organic peroxide are 1 hour and 1 minute, respectively.

The "glass transition point" as used herein is measured in accordance with JIS K7121-1987 and is calculated from the midpoint of a heat flux. The "glass transition points" is measured after the sample has been heat treated under specified conditions.

In the present invention, the polypropylene resin, the base resin, the resin particles, the surface-modified resin particles, expanded PP beads and PP molding are substantially non-crosslinked. The term "substantially non-crosslinked" as used herein is as defined below. Sample resin is immersed in xylene (100 ml xylene per 1 g sample resin) and the mixture is refluxed for 8 hours. The mixture is then immediately filtered through a 74 μm wire net (specified in Japanese Industrial Standard JIS Z8801-1966-). The dry weight of the xylene-insoluble matters left on the wire net is measured. A crosslinking degree P (%) is calculated from the formula:

$$P(\%) = (M/L) \times 100$$

wherein M represents the weight (g) of the xylene-insoluble matters and L represents the weight (g) of the sample. "Substantially non-crosslinked" means that the crosslinking degree P is 10% or less.

In the present invention, the crosslinking degree P of the base resin, the resin particles, the surface-treated (or surface modified) resin particles, expanded PP beads and PP molding is preferably 5% or less, more preferably 3% or less, most preferably 1% or less. In general, the surface treatment does not result in an increase of the crosslinking degree P.

The surface-modified resin particles are then foamed and expanded to obtain expanded PP beads using a blowing agent. Preferably, the expansion step is carried out by a conventional dispersion method in which the resin particles are dispersed in a dispersing medium in a closed vessel in the presence of a blowing agent and heated to impregnate the resin particles with the blowing agent. While being maintained under a pressurized condition and at a temperature sufficient to expand the resin particles, the dispersion is discharged from the vessel to an atmosphere of a pressure lower than the pressure in the vessel, thereby obtaining expanded PP beads.

While the surface modification of the resin particles with the organic peroxide and the subsequent expansion of the surface-modified resin particles may be carried out in separate vessels, it is preferred that that the expansion step be carried out by the dispersion method and that the expansion step be carried out in the same vessel for reasons of efficiency. Namely, the surface modification the resin particles and expansion of the surface-modified resin particles may be carried out by simply conducting the dispersion method after addition of a predetermined amount of the organic peroxide in the dispersion.

In performing the expansion, it is preferred that the weight ratio of the surface-modified resin particles to the dispersing medium be 0.5:1 or less, preferably 0.1:1 to 0.5:1, for reasons of prevention of melt adhesion of the surface-modified resin particles in the dispersion. Thus, when the surface modification of the resin particles is carried out in a vessel with the ratio of the resin particles to the dispersing medium being maintained in a range of 0.6:1 to 1.3:1, and when the expansion is performed in the same vessel, a fresh dispersing medium is added to the vessel before subjecting the dispersion to the expansion step.

The surface-modified resin particles, expanded PP beads obtained therefrom and PP molding obtained from the beads may contain 100–8000 ppm by weight of an alcohol having a molecular weight of 50 or more and produced by the decomposition of the organic peroxide. For example, p-t-butylcyclohexanol may be present in the expanded PP beads, when bis(4-t-butylcyclohexyl)peroxydicarbonate is used as the organic peroxide. i-Propanol, s-butanol, 3-methoxybutanol, 2-ethylhexylbutanol or t-butanol may be detected, when the corresponding peroxide is used.

To prevent melt-adhesion of the surface-treated resin particles with each other during the expansion step, it is desirable to add to the dispersing medium a dispersing agent which is finely divided organic or inorganic solids. For reasons of easiness of handling, the use of an inorganic powder is preferred. Illustrative of suitable dispersing agents are natural or synthetic clay minerals (such as kaolin, mica, pyrope and clay), alumina, titania, basic magnesium carbonate, basic zinc carbonate, calcium carbonate and iron oxide. The dispersing agent is generally used in an amount of 0.001–5 parts by weight per 100 parts by weight of the resin particles.

To improve the dispersing efficiency of the dispersing agent, namely to reduce the amount of the dispersing agent while retaining its function to prevent melt-adhesion of the surface-treated particles, a dispersion enhancing agent may be preferably added to the dispersing medium. The dispersion enhancing agent is an inorganic compound capable of being dissolved in water in an amount of at least 1 mg in 100 ml of water at 40° C. and of providing divalent or trivalent anion or cation. Examples of the dispersion enhancing agents include magnesium chloride, magnesium nitrate, magnesium sulfate, aluminum chloride, aluminum nitrate, aluminum sulfate, ferric chloride, ferric sulfate and ferric nitrate. The dispersion enhancing agent is generally used in an amount of 0.0001–1 part by weight per 100 parts by weight of the polypropylene resin particles.

The blowing agent may be an organic physical blowing agent or an inorganic physical blowing agent. Examples of the organic physical blowing agents include aliphatic hydrocarbons such as propane, butane, pentane, hexane and heptane, alicyclic hydrocarbons such as cyclobutane and cyclohexane, and halogenated hydrocarbons such as chlorofluoromethane, trifluoromethane, 1,2-difluoroethane, 1,2,2,2-tetrafluoroethane, methylchloride, ethylchloride and methylenechloride. Examples of inorganic physical blowing agents include air, nitrogen, carbon dioxide, oxygen, argon and water. These organic and inorganic blowing agents may be used singly or as a mixture of two or more. For reasons of stability (uniformity) of apparent density of expanded PP beads, low costs and freedom of environmental problem, the use of air or nitrogen is preferred. Water as the blowing agent may be that used in dispersing the surface-modified resin particles in the dispersing medium.

The amount of the blowing agent may be suitably determined according to the kind of the blowing agent, expansion temperature and apparent density of the expanded PP beads to be produced. When nitrogen is used as the blowing agent and when water is used as the dispersing medium, for example, the amount of nitrogen is preferably such that the pressure within the closed vessel in a stable state immediately before the initiation of the expansion, namely the pressure (gauge pressure) in the upper space in the closed vessel, is in the range of 0.6–8 MPa(G). In general, the pressure in the upper space in the closed vessel is desirably increased as the apparent density of the expanded PP beads to be obtained is reduced.

It is preferred that the expansion of the surface-modified resin particles be performed so that the expanded PP beads have an apparent density of 10 g/L to 500 g/L. The apparent density (g/L) is obtained by dividing the weight W (g) of the expanded PP beads by the volume V (L) of the apparent volume thereof (density=W/V). The apparent volume is measured as follows:

In a measuring cylinder, about 5 g of expanded PP beads are allowed to stand at 23° C. for 48 hours in the atmosphere and thereafter immersed in 100 ml water contained in a graduation cylinder at 23° C. From the increment of the volume, the apparent volume can be determined.

It is preferred that the expansion of the surface-modified resin particles be performed so that the expanded PP beads have a high temperature endothermic peak, in a DSC curve thereof, in addition to an intrinsic endothermic peak located at a lower temperature side of the high temperature peak, because the expanded PP beads have high content of closed cells and extremely suited to obtain a high rigidity PP molding.

The high temperature peak preferably has such an area corresponding to heat of fusion (calorific value; absolute value) in the range of 2–70 J/g, more preferably 3–65 J/g, most preferably 12–58 J/g. When the heat of fusion of the high temperature peak is less than 2 J/g, the compression strength and shock absorbing power of a PP molding tend to be reduced. Too high a heat of fusion of the high temperature peak in excess of 70 J/g requires a high pressure to increase the inside pressure in the beads before the molding step. It is preferred that the heat of fusion of the high temperature peak is 10–60%, more preferably 20–50%, of a total of the heat of fusion of the high temperature peak and the heat of fusion of the intrinsic peak. The total heat of fusion is suitably in the range of 40–150 J/g.

The DSC curve herein is as obtained by the differential scanning calorimetric analysis wherein a sample (2–4 mg of expanded PP beads) is heated from room temperature (10–40° C.) to 220° C. in an atmosphere of nitrogen at a rate of 10° C./min. FIG. 1 shows an example of a DSC curve having an intrinsic endothermic peak P1 at a peak temperature T1 and a high temperature endothermic peak P2 at a peak temperature T2. The area of a peak corresponds to the heat of fusion thereof.

The area of the high temperature peak P2 is determined as follows. In the DSC curve (first DSC curve) C having two endothermic peaks P1 and P2 at temperatures T1 and T2, respectively, as shown in FIG. 1, a straight line A extending between the point Z1 in the curve at 80° C. and the point Z2 in the curve at a melt completion temperature Tmc is drawn. The melt completion temperature Tmc is represented by a point at which the high temperature peak P2 ends and meets the base line on a high temperature side. Next, a line B which is parallel with the ordinate and which passes a point $B_C$ between the peaks P1 and P2 is drawn. The line B crosses the line A at a point $B_A$. The position of the point $B_C$ is such that the length between the point $B_A$ and the point $B_C$ is minimum. The area of the high temperature peak P2 is the shaded area defined by the line A, line B and the DSC curve C. A total of the heat of fusion of the high temperature peak P2 and the heat of fusion of the intrinsic peak P1 corresponds to an area defined by the line A and the DSC curve.

When expanded PP beads having a weight per bead of less than 2 mg are measured for the intrinsic peak P1 and high temperature peak P2 using a differential scanning calorimeter, two or more beads are sampled for the measurement such that the total weight of the sample is in the range of 2–10 mg. When expanded PP beads to be measured have a weight per bead of 2–10 mg, one bead is sampled for the DSC measurement. When expanded PP beads to be measured have a weight per bead of more than 10 mg, one of the beads is cut into two or more pieces and one of the pieces having a weight of 2–10 mg is sampled for the DSC measurement. In this case, an expanded PP bead having a weight W and an outer peripheral surface area of S is preferably cut into n number of pieces so that cut pieces have nearly equal weight of W/n and have a surface portion which is derived from the outer peripheral surface of the bead and which has an area of nearly S/n. For example, when the expanded PP beads to be measured have a weight per bead of 18 mg, one of the beads is cut along a plane bisecting the bead and one of the cut pieces is used for measurement. In the present specification, except otherwise noted, the term "heat of fusion of the high temperature peak of expanded PP bead(s)" is intended to refer to the heat of fusion as measured in the above-described method, and should be discriminated from "heat of fusion of the high temperature peak of a surface region or an inside region of an expanded PP bead" which will be described hereinafter.

The above-described high temperature peak P2 is present in the DSC curve measured first. Once the expanded PP beads have completely melted, the high temperature peak P2 no longer appears. Thus, when the sample after the first DSC measurement is cooled to room temperature (10–40° C.) and is measured again for a DSC curve by heating to 220° C. in an atmosphere of nitrogen at a rate of 10° C./min, the second DSC curve does not show such a high temperature peak but contains an endothermic peak attributed to the melting of the base resin, just like a DSC curve shown in FIG. 2.

Figure 2:
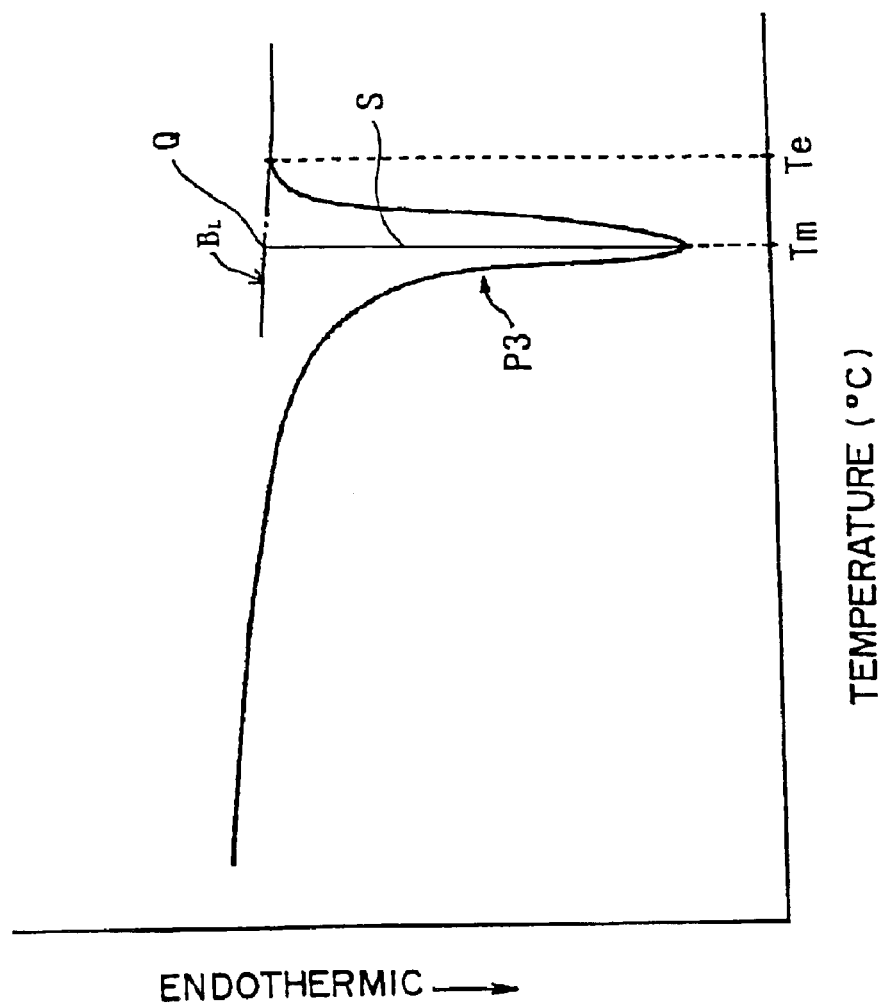
FIG. 2 is a second time DSC curve of polypropylene resin particles which have not yet been subjected to surface modification and which have been once subjected to DSC measurement.

In the present specification and claims, the term "melting point of the base resin" is intended to refer to that measured by DSC analysis of base resin particles which have not yet been subjected to surface modification treatment with an organic peroxide. Namely, "melting point of the base resin" is measured by the differential scanning calorimetric analysis wherein a sample (2–4 mg of resin particles of the base resin) is heated from room temperature (10–40° C.) to 220° C. in an atmosphere of nitrogen at a rate of 10° C./min. The sample is then cooled to room temperature (10–40° C.) and is measured again for a DSC curve by heating to 220° C. in an atmosphere of nitrogen at a rate of 10° C./min to obtain a second DSC curve as shown in FIG. 2. The temperature Tm of the endothermic peak P3 at 130–170° C. in the second DSC curve as shown in FIG. 2 is inherent to the polypropylene resin and represents the "melting point of the base resin". Two or more endothermic peaks might be observed in the second DSC curve, when, for example, the resin particles are composed of two or more different polypropylene resins. In this case, the melting point Tm is the peak temperature of that peak which has the greatest peak height among those peaks. When there are a plurality of peaks having the same greatest peak height, then the melting point Tm is the highest peak temperature among those peaks. The term "peak height" herein refers to the length S between the top of the peak P3 and a point Q at which a line parallel with the ordinate and passing through the top of the peak P3 crosses the base line $B_L$. In FIG. 2, the temperature Te at which the endothermic peak P3 ends and meets the base line $B_L$ refers to the "melt completion temperature of the base resin".

The high temperature peak P2 of expanded PP beads generally appears at a temperature T2 ranging from (Tm+5° C.) to (Tm+15° C.). The endothermic peak P1 of expanded PP beads generally appears at a temperature T1 ranging from (Tm−5° C.) to (Tm+5° C.). The endothermic peak in the second DSC measurement of expanded PP beads generally corresponds to that in the second DSC curve of the precursor base resin particles and generally appears at a temperature ranging from (Tm−2° C.) to (Tm+2° C.).

As described above, it is preferred that the expanded PP beads have such a crystal structure that a high temperature peak is present in a first DSC curve thereof in addition to an intrinsic peak. A difference between the melting point of the polypropylene resin and expansion temperature has a great influence upon the heat of fusion (peak area) of the high temperature peak.

The heat of fusion of the high temperature peak of the expanded PP beads is a factor for determining the minimum temperature of steam which provides a saturated steam pressure required for melt-bonding the beads to each other. In general, when the same base resin is used, the smaller the heat of fusion of the high temperature peak, the lower becomes the minimum temperature. Further, the higher the expansion temperature, the smaller becomes the heat of fusion of the high temperature peak.

When expanded PP beads having a small heat of fusion of the high temperature peak are used, the mechanical properties of the resulting PP molding are relatively low, though the minimum temperature required for melt-bonding the beads can be low. On the other hand, when expanded PP beads having a large heat of fusion of the high temperature peak are used, the mechanical properties of the resulting PP molding are relatively high. In this case, however, since the minimum temperature required for melt-bonding the beads is high, it is necessary to use high pressure steam for the production of PP moldings. Thus, the most preferred expanded PP beads would be such that the heat of fusion of the high temperature peak thereof is large but the minimum temperature required for melt-bonding the beads is low. The present invention does provide such ideal expanded PP beads. The expanded PP beads according to the present invention can give a high rigidity PP molding without using a high temperature steam.

The expanded PP beads providing a DSC curve having such a high temperature peak can be suitably produced by maintaining the dispersion containing the surface-modified resin particles in a vessel at a first fixed temperature between a temperature lower by 20° C. than the melting point of the base resin (Tm−20° C.) and a temperature lower than the melt completion point of the base resin (Te) for a period of time of preferably 10–60 min, preferably 15–60 min and then discharging the dispersion from the vessel after increasing the temperature of the dispersion to a second fixed temperature between a temperature lower by 15° C. than the melting point of the base resin (Tm−15° C.) and a temperature higher by 10° C. than the melt completion point of the base resin (Te+10° C.) or, if necessary, after maintaining the dispersion at the second fixed temperature for a period of time of 10–60 min.

The area of the high temperature peak mainly depends upon the above first fixed temperature at which the dispersion is maintained before expansion treatment, the time for which the dispersion is maintained at the first fixed temperature, the above second fixed temperature, the time for which the dispersion is maintained at the second fixed temperature, the heating rate at which the dispersion is heated to the first fixed temperature and the heating rate at which the dispersion is heated from the first fixed temperature to the second fixed temperature. The area of the high temperature peak increases with an increase of the retention time at the first and second fixed temperatures. The heating rate (average heating rate from the commencement of heating until the fixed temperature is reached) in each of the heating stage up to the first fixed temperature and the succeeding heating stage from the first fixed temperature to the second fixed temperature is generally 0.5–5° C. per minute. Suitable conditions for the preparation of expanded PP beads having desired heat of fusion of the high temperature peak can be determined by preliminary experiments on the basis of the above points.

The above temperature ranges for the formation of the high temperature peak and for the expansion of the resin particles are suitably adopted in the case where an inorganic physical blowing agent is used. When an organic physical blowing agent is used, the suitable temperature ranges will shift toward low temperature side and vary with the kind and amount of the organic physical blowing agent.

The expanded PP beads used for the production of a foamed molding according to the present invention preferably have at least one of the following characteristics.

A surface region of the expanded PP bead preferably has a melting point (Tms) lower than the melting point (Tmi) of an inside region thereof (Tms<Tmi). The difference between the melting point (Tmi−Tms) is preferably at least 0.05° C., more preferably at least 0.1° C., most preferably at least 0.3° C. The melting point Tms is determined as follows. A surface region of the expanded PP bead is cut and about 2–4 mg of such cut samples are collected. The sample is subjected to DSC analysis in the same manner as described previously with regard to the measurement of the melting point Tm. The peak temperature of a peak corresponding to the endothermic peak P3 in the second DSC curve represents the melting point Tms. The melting point Tmi is also measured in the same manner as above except that inside region of the bead is cut and collected.

In the case of the expanded PP bead having a high temperature endothermic peak in a DSC curve thereof, the heat of fusion Hs of the high temperature endothermic peak of the surface region of the bead is preferably smaller than the heat of fusion Hi of the high temperature endothermic peak of the inside region of the bead such that the following relationship is established:

$$Hs < 0.86 \times Hi$$

for reasons that the expanded PP beads can be molded at a lower temperature as compared with surface unmodified expanded PP beads. Such an effect increases with a decrease of Hs. Thus, the Hs and Hi of the expanded PP bead preferably have the following relationship: $Hs<0.83 \times Hi$, more preferably $Hs<0.80 \times Hi$, still more preferably $Hs<0.75 \times Hi$, yet still more preferably $Hs<0.70 \times Hi$, most preferably $Hs<0.60 \times Hi$.

Preferably, Hs is not smaller than $0.25 \times Hi$ ($Hs \geq 0.25 \times Hi$).

It is also preferred that Hs is in the range of 1.7–60 J/g, more preferably 2–50 J/g, still more preferably 3–45 J/g, most preferably 4–40 J/g, for reasons of availability of a low molding temperature The surface region and inside region of an expanded PP bead are sampled by cutting the bead with a knife or a microtome. The surface region or regions are sliced off the bead at any arbitral position or positions to a thickness of 200 μm or less such that the outer surface of the bead provides one of the both sides of each of the sliced surface regions. Thus, the other side of each of the sliced surface regions does not contain that part of the PP bead which was present at a depth of more than 200 μm before cutting. The depth herein is in the direction from the outer surface of the bead to the center of gravity thereof. When the sliced surface region or regions contain that part of the PP bead which was present at a depth of more than 200 μm, precise data cannot be obtained. When the amount of the surface region or regions sampled from the bead is less than 2 mg, one or more additional beads are cut to collect 2–4 mg of the sample.

The inside region is obtained by removing all of the surface region of the bead up to the depth of 200 μm in the direction from the outer surface of the bead to the center of gravity thereof. When the size of the bead is so small that no inside region is obtainable after removal of surface region of the 200 μm thick, then the inside region is obtained by removing all of the surface region of the bead up to the depth of 100 μm in the direction from the outer surface of the bead to the center of gravity thereof. When the size of the bead is so small that no inside region is obtainable after removal of surface region of the 100 μm thick, then the inside region is obtained by removing all of the surface region of the bead up to the depth of 50 μm in the direction from the outer surface of the bead to the center of gravity thereof. When the amount of the inside region obtained from one bead is less than 2 mg, one or more additional beads are used to collect 2–4 mg of the sample. The thus collected samples are measured for the melting point and heat of fusion of the high temperature peak according to the method described above.

The expanded PP bead preferably has a surface having a melt initiation temperature, as measured by micro differential thermoanalysis, not higher than the melting point of the base resin. In the conventional expanded PP beads, the melt initiation temperature is higher by at least 5° C. than the melting point of the base resin.

Further, the expanded PP bead preferably has a surface having an extrapolated melt initiation temperature, as measured by micro differential thermoanalysis, not higher than (Tm+4° C.) where Tm is the melting point of the base resin. In the conventional expanded PP beads, the extrapolated melt initiation temperature is higher by at least 8° C. than the melting point (Tm).

Figure 5:
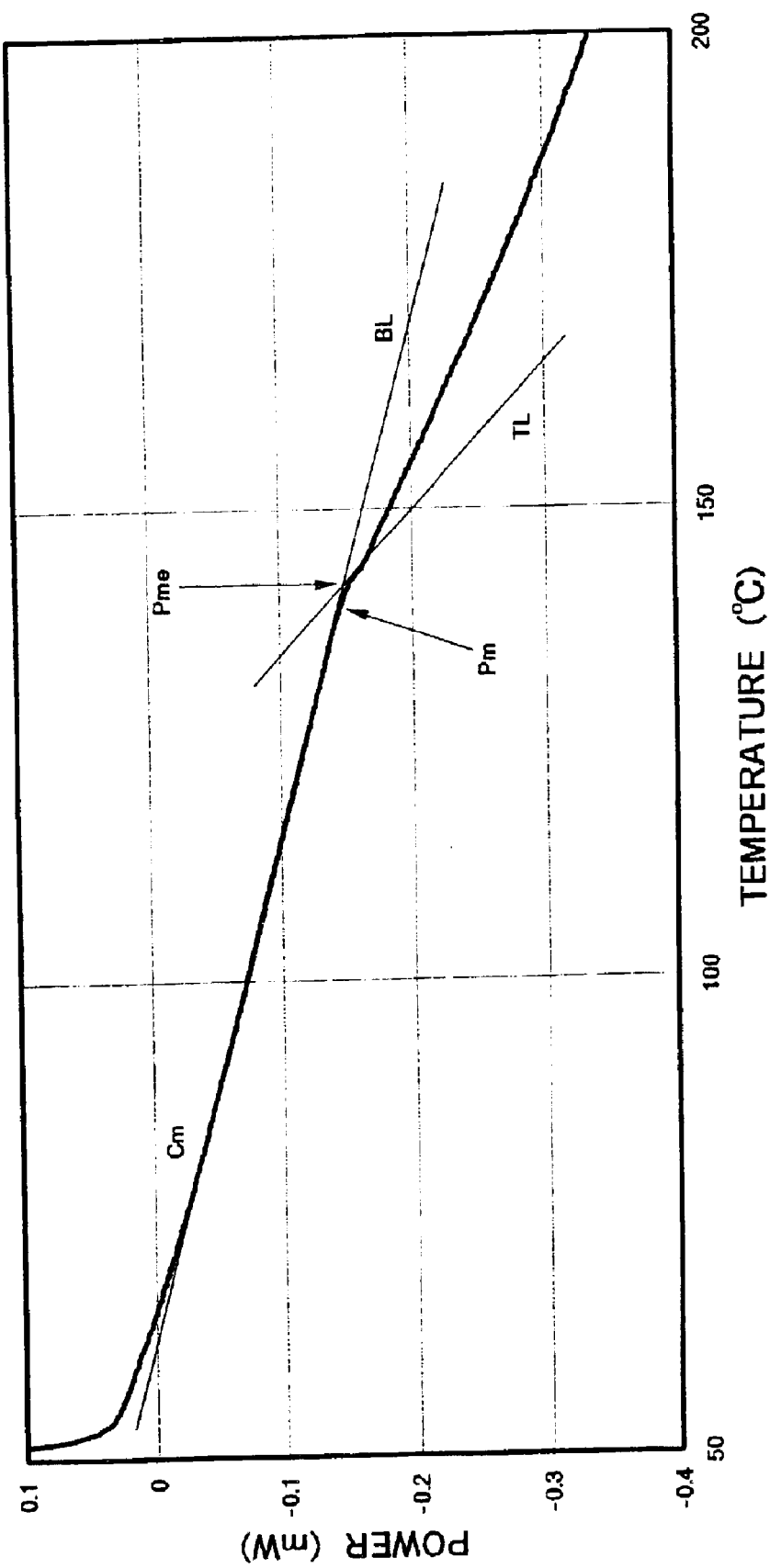
FIG. 5 shows a µDTA curve obtained by micro differential thermoanalysis of a surface of an expanded PP bead obtained in Example 9.

The micro differential thermoanalysis (μDTA) is performed using a micro differential thermoanalysis system ("Type 2990 Micro Thermal Analyzer" of T. A. Instrument, Japan Inc.) at a heating rate of 10° C./sec from 25° C. to 200° C. The "melt initiation temperature" as used herein is intended to refer to a temperature at which a μDTA curve starts separating from the base line thereof. The "extrapolated melt initiation temperature" as used herein is intended to refer to a temperature at the intersection of the base line and a tangential line drawn from such a point on the μDTA curve on the higher temperature side of the melt initiation temperature that the gradient of the tangential line relative to the base line is maximum. For example, in the lower μDTA curve Cm shown in FIG. 3, Pm and Pme represent the melt initiation temperature (about 131° C.) and extrapolated melt initiation temperature (about 135° C.), respectively. At Pme, a tangentially extrapolated line TL extending from a point Km on the curve Cm intersects the base line BL. The point Km is so located on the higher temperature side of the melt initiation temperature Pm as to provide the maximum gradient of the tangential line TL relative to the base line BL. Similarly, in the upper pDTA curve Cnm, Pnm and Pnme represent the melt initiation temperature (about 168° C.) and extrapolated melt initiation temperature (about 171° C.), respectively. In FIG. 5, Pm and Pme represent the melt initiation temperature (about 140° C.) and extrapolated melt initiation temperature (about 142° C.), respectively.

The μDTA is performed by fixing a sample expanded PP bead on a sample stage. When the bead has an excessively large size, the bead may be cut into a suitable size. A probe tip of the thermal analyzer is directed toward an arbitral region of the surface of the bead and then displaced to contact with the surface of the bead. Then, the measurement is carried out while maintaining the contact state. The probe tip has a size of 0.2 μm×0.2 μm. Similar measurement is repeated at 10 different positions on a surface of the bead to obtain 10 μDTA curves in total, from each of which the melt initiation temperature and extrapolated melt initiation temperature are determined. The "melt initiation temperature" and "extrapolated melt initiation temperature" as used herein are each an arithmetic mean of the eight values remaining after omitting the maximum and minimum values from the ten measured values. When two or more maximum and/or two or more minimum values exist, an arithmetic mean is calculated from the values remaining after omitting the maximum and minimum values. When all of the ten measured values are the same, then that value represents the arithmetic mean. When there are no other values than the maximum and minimum values and when the difference between them is not greater than 10° C., then an arithmetic mean of the ten values is adopted. When there are no other values than the maximum and minimum values and when the difference between them is greater than 10° C., then μDTA is repeated for another ten different points until the above-defined "melt initiation temperature" and "extrapolated melt initiation temperature" are determined.

The reduction of the melt initiation temperature and/or melt initiation temperature in the expanded PP bead of the present invention is considered to contribute to a reduction of the minimum temperature required for melt-bonding the beads. The melt initiation temperature is preferably Tm or less, more preferably (Tm−5° C.) or less, even more preferably (Tm−10° C.) or less, still more preferably (Tm−15° C.) or less, yet still more preferably (Tm−50° C.) to (Tm−16° C.), most preferably (Tm−35° C.) to (Tm−17° C.). The extrapolated melt initiation temperature is preferably (Tm−1° C.) or less, more preferably (Tm−6° C.) or less, even more preferably (Tm−11° C.) or less, still more preferably (Tm−16° C.) or less, most preferably (Tm−35° C.) to (Tm−17° C.).

Such a reduction of the minimum temperature required for melt-bonding the beads is particularly advantageous when the base resin of the expanded PP beads has a melting point of 158° C. or more and when the expanded PP beads has a high temperature peak. When the base resin of the expanded PP beads has a melting point of 158° C. or more, it is preferred that the melt initiation temperature be 158° C. or less, more preferably 155° C. or less, still more preferably 150° C. or less, yet still more preferably 110–147° C., most preferably 125–145° C. While the lower the melt initiation temperature of the surfaces of the expanded PP beads is, the lower is the minimum temperature required for melt-bonding the beads, an excessively low melt initiation temperature will cause a reduction of mechanical strength, such as compression strength, of a PP molding obtained from the expanded PP beads.

The expanded PP bead preferably has an MFR value which is not smaller than that of the resin particles before the surface modification with the organic peroxide and which is in the range of 0.5–150 g/10 min, more preferably 1–100 g/10 min, most preferably 10–80 g/10 min. It is also preferred that the MFR value of the expanded PP bead be at least 1.2 times, more preferably at least 1.5 times, most preferably 1.8–3.5 times, that of the resin particles prior to the surface modification.

For measuring the MFR, the expanded PP beads are pressed at 200° C. using a heat press into a sheet having a thickness of 0.1–1 mm. Pellets or columns are prepared from the sheet to obtain a sample. The sample is measured for MFR in accordance with the Japanese Industrial Standard JIS K7210-1976, Test Condition 14. In the measurement of MFR, air bubbles must be removed from the sample. If necessary, heat press treatment should be repeated up to three times in total to obtain bubble-free sheet.

The expanded PP bead preferably has a surface region having a greater oxygen content per unit weight than that of the inside region. When the organic peroxide used for the surface modification of the resin particles is of a type which generates oxygen radicals upon being decomposed, part of the oxygen radicals are bound to surfaces of the particles. The analysis, using an infrared spectrometer equipped with the attenuated total reflectance (ATR analysis), of a surface of a PP molding obtained from expanded PP beads of the present invention shows a stronger absorption at a wavelength of near 1033 cm$^{-1}$ than that of a PP molding obtained from conventional expanded PP beads. Thus, the ratio of the peak height at 1033 cm$^{-1}$ to the peak height at 1166 cm$^{-1}$ in the case of the PP molding of the present invention is greater than that of the conventional molding. Further, the analysis using an energy dispersion spectroscope (EDS) shows that a surface of the expanded PP bead according to the present invention has an oxygen to carbon molar ratio (O/C molar ratio) is 0.2 whereas an inside of the bead has an O/C molar ratio of 0.1. Further, a surface of the conventional expanded PP bead has O/C molar ratio of 0.1. The preferred O/C ratio is at least 0.15.

Although not wishing to be bound by the theory, such an oxygen-added surface of the expanded PP bead is considered to enhance steam permeability thereof. As a result of one of the foregoing characteristics (namely, Tms<Tmi; Hs<0.86× Hi; melt initiation temperature≦melting point; extrapolated melt initiation temperature≦melting point+4° C.; and oxygen-added surface) or as a result of synergetic effect of two or more of the foregoing characteristics, the minimum temperature required for melt-bonding the beads is lowered while ensuring high mechanical strengths of a PP molding obtained from the beads.

The expanded PP beads obtained by the above process are aged in the atmosphere. If desired, the PP beads may be treated to increase the pressure inside of the cells thereof and, thereafter, heated with steam or hot air to improve the expansion ratio thereof.

A PP molding may be suitably obtained by a batch-type molding method in which expanded PP beads (if necessary, after being treated to increase the pressure inside of the cells thereof) are filled in a mold adapted to be heated and cooled and to be opened and closed. After closing the mold, saturated steam is fed to the mold to heat and fuse-bond the beads together. The mold is then cooled and opened to take a PP molding out of the mold. A number of molding machines are commercially available. They are generally designed to have a pressure resistance of 0.41 MPa(G) or 0.45 MPa(G). Thus, the above method is generally carried out using steam having a pressure of 0.45 MPa(G) or less, more preferably 0.41 MPa(G) or less.

A PP molding may be also produced by a continuous method in which expanded PP beads (if necessary, after being treated to increase the pressure inside of the cells thereof) are fed to a path which is defined between a pair of belts continuously running in the same direction and which has a heating zone and a cooling zone. During the passage through the heating zone, the expanded PP beads are heated with saturated steam and fuse-bonded to each other. The resulting molding is cooled in the cooling zone, discharged from the path and cut to a desired length. The above continuous method is disclosed in, for example, JP-A-H09-104026, JP-A-H09-104027 and JP-A-H10-180888.

The above-mentioned treatment of the expanded PP beads to increase the pressure inside of the cells thereof may be carried out by allowing the beads to stand for a suitable period of time in a closed vessel to which a pressurized gas has been fed. Any gas containing an inorganic gas as a major ingredient may be used for the pressure increasing treatment as long as it is in the form of gas under conditions where the expanded beads are treated. Examples of the inorganic gas include nitrogen, oxygen, air, carbon dioxide and argon. Nitrogen or air is suitably used for reasons of costs and freedom of environmental problems.

Described below will be a specific method of increasing the inside pressure of the cells using air and a method of measuring the thus increased inside pressure in the cells.

Expanded PP beads are placed in a closed vessel into which pressurized air is fed. The beads are allowed to stand in the vessel for a certain period of time (generally several hours) while maintaining the pressure inside the vessel at 0.98–9.8 MPa(G) so that the inside pressure of the cells increases. The thus treated expanded PP beads are placed in a mold for the production of a PP foam molding. The inside pressure of the cells Pi (MPa(G)) as used herein is defined as follows:

$$Pi = Wi \times R \times Te/(M \times V)$$

wherein
Wi is an amount of air increased (g),
R is the gas constant and is 0.0083 (MPa·L/(K·mol)),
Te is an ambient temperature and is 296K,
M is the molecular weight of air and is 28.8 (g/mol), and
V is the volume (liter) of the air in the expanded beads.

The amount of air increased Wi (g) is measured as follows.

A quantity of expanded beads whose cells have been just pressurized with air in the vessel are taken out of the vessel and collected in a polyethylene film bag having a size of 70 mm×100 and provided with a multiplicity of perforations each having a size preventing the passage of the beads. The beads in the bag are placed, within 60 seconds after the take-out, on a weighing device provided in a thermostatic chamber maintained at 23° C. and 50% relative humidity under ambient pressure. The weight Ua (g) of the beads is measured just 120 seconds after the expanded beads have been taken out from the vessel. The expanded beads are then allowed to stand for 48 hours in the chamber at 23° C. and 50% relative humidity under ambient pressure. The air in the cells of the expanded beads gradually permeates through the cell walls and escapes from the beads. Therefore, the weight of the beads decreases with the lapse of time. However, an equilibrium has been established and the weight decrease no longer occurs after lapse of the 48 hours period. Thus, the weight of the expanded beads Ub (g) is measured in the same chamber after the lapse of the 48 hours period. Of course, the weight of the polyethylene bag is also measured and taken in consideration. The measurement of the weight should be carried out precisely to the fourth decimal place (0.0001 g) The balance between the weights Ua and Ub represents the amount of gas increased (Wi=Ua−Ub).

The volume of the air in the expanded PP beads V (L) is defined as follows.

$$V(L) = Va - Vb$$

wherein
Va is the apparent volume of the expanded PP beads, and Vb is the volume of the base resin of the beads and is obtained by dividing the weight of the beads Ub (g) by the density of the base resin (g/L).

The apparent volume Va (L) of the expanded PP beads is measured as follows. The expanded PP beads which have been subjected to the measurement of the weight Ub as described above, are immersed in 100 ml of water at 23° C. contained in a graduated measuring cylinder. From the volume increment, apparent volume Va (L) of the beads is determined. The quantity of the above-described expanded beads sampled and collected in the bag is such that Ub and Va fall within the ranges of 0.5 to 10 g and 50 to 90 cm$^3$, respectively.

The inside pressure Pi of the cells of the expanded PP beads is preferably 0.98 MPa(G) or less, more preferably 0.69 MPa(G) or less, still more preferably 0.49 MPa(G) or less. The apparent density of the PP molding obtained by the above methods may be controlled as desired and is generally in the range of 9–600 g/L. The term "apparent density" of the PP molding as used herein is as specified in JIS K7222-1999. The volume of a PP molding used for the calculation of the apparent density is determined from the external dimensions thereof. When the external shape of the molding is so complicated that the volume thereof is difficult to be determined, then the volume thereof is measured by immersing the molding in water and is given as a volume of water replaced by the molding. The PP molding preferably has open cell content (according to ASTM-D2856-70, Procedure C) of 40% or less, more preferably 30% or less, most preferably 25% or less, for reasons of high mechanical strengths.

A surface layer, such as a reinforcing layer or a decorative layer) may be integrally provided on a surface of the above PP molding. A method of producing such a composite article is disclosed in, for example, U.S. Pat. Nos. 5,928,776, 6,096,417, 6,033,770, 5,474,841, EP-B-477476, WO98/34770, WO98/00287 and JP-B-3092227, the disclosure of which is hereby incorporated by reference herein.

An insert may be integrated with the above PP molding such that at least part of the insert is embedded therein. A method of producing such a composite article is disclosed in, for example, U.S. Pat. Nos. 6,033,770, 5,474,841, JP-A-S59-1277714 and JP-B-3092227, the disclosure of which is hereby incorporated by reference herein.

The following examples will further illustrate the present invention. Parts are by weight.

EXAMPLES 1–7 AND COMPARATIVE EXAMPLES 1–5

100 Parts of polypropylene resin selected from those shown in Table 1 and indicated in Tables 3-1 and 3-2 were blended with 0.05 part of zinc borate powder (cell controlling agent) and the blend was kneaded in an extruder and extruded into strands. The strands were immediately introduced in water at 18° C. for quenching. The cooled strands were then cut into particles each having a length/diameter ratio of about 1.0 and a mean weight of 2 mg.

In a 400 liter autoclave, 100 parts of the above resin particles are charged together with 220 parts of ion-exchanged water at 18° C., 0.005 part of sodium dodecyl-benzenesulfonate (surfactant), 0.3 part of kaolin powder (dispersing agent), 0.01 part of aluminum sulfate powder (dispersion enhancing agent), an organic peroxide selected from those shown in Table 2 and indicated in Table 3-1 or 3-2 in an amount shown in Table 3-1 or Table 3-2, and carbon dioxide (blowing agent) in an amount shown in Table 3-1 or 3-2. The mixture in the autoclave was dispersed with stirring and heated to a temperature lower by 5° C. than the expansion temperature shown in Table 3-1 or 3-2 at an average heating rate of 3° C./min and then maintained at that temperature for 15 min. Thereafter, the temperature was raised to the expansion temperature at an average heating rate of 3° C./min and maintained at that temperature for 15 min. One end of the autoclave was then opened to discharge the dispersion to the atmosphere to obtain expanded PP beads. The discharge was carried out while feeding carbon dioxide gas such that the pressure within the autoclave was maintained at a pressure equal to the pressure in the autoclave immediately before the commencement of the discharge. The expanded PP beads were washed, centrifuged and allowed to stand in the atmosphere for 48 hours for aging. The beads were then measured for heat of fusion of a high temperature peak thereof and melting point and high temperature peaks of surface and insides region thereof. Also measured were MFR and apparent density of the beads. The results are summarized in Tables 3-1 and 3-2. In Table 2, "1 Hr half life temperature" and "1 Min half life temperature" are as defined previously.

TABLE 1

| Resin No. | Kind of Resin | Glass Transition Point (° C.) | Vicat Softening Point (° C.) | MFR (g/10 min) | Melting Point (° C.) |
|---|---|---|---|---|---|
| 1 | Propylene homopolymer | −21 | 148 | 8 | 163 |
| 2 | Ethylene-propylene random copolymer | −28 | 122 | 4 | 136 |
| 3 | Propylene homopolymer | −20 | 147 | 18 | 162 |

TABLE 2

| Organic Peroxide No. | Organic Peroxide | 1 Hr Half life Temperature (° C.) | 1 Min Half life Temperature (° C.) |
|---|---|---|---|
| 1 | Benzoyl peroxide | 92 | 130 |
| 2 | Bis(4-t-butyl cyclohexyl) peroxydicarbonate | 58 | 92 |

The expanded PP beads were placed in a vessel, to which pressurized air was fed so that the inside pressure of the cells of the beads was increased to a pressure shown in Tables 3-1 and 3-2. The resulting beads were then molded in the manner shown below using a molding device shown in FIG. 4 to obtain a foamed PP molding having the properties shown in Tables 3-1 and 3-2.

Figure 4:
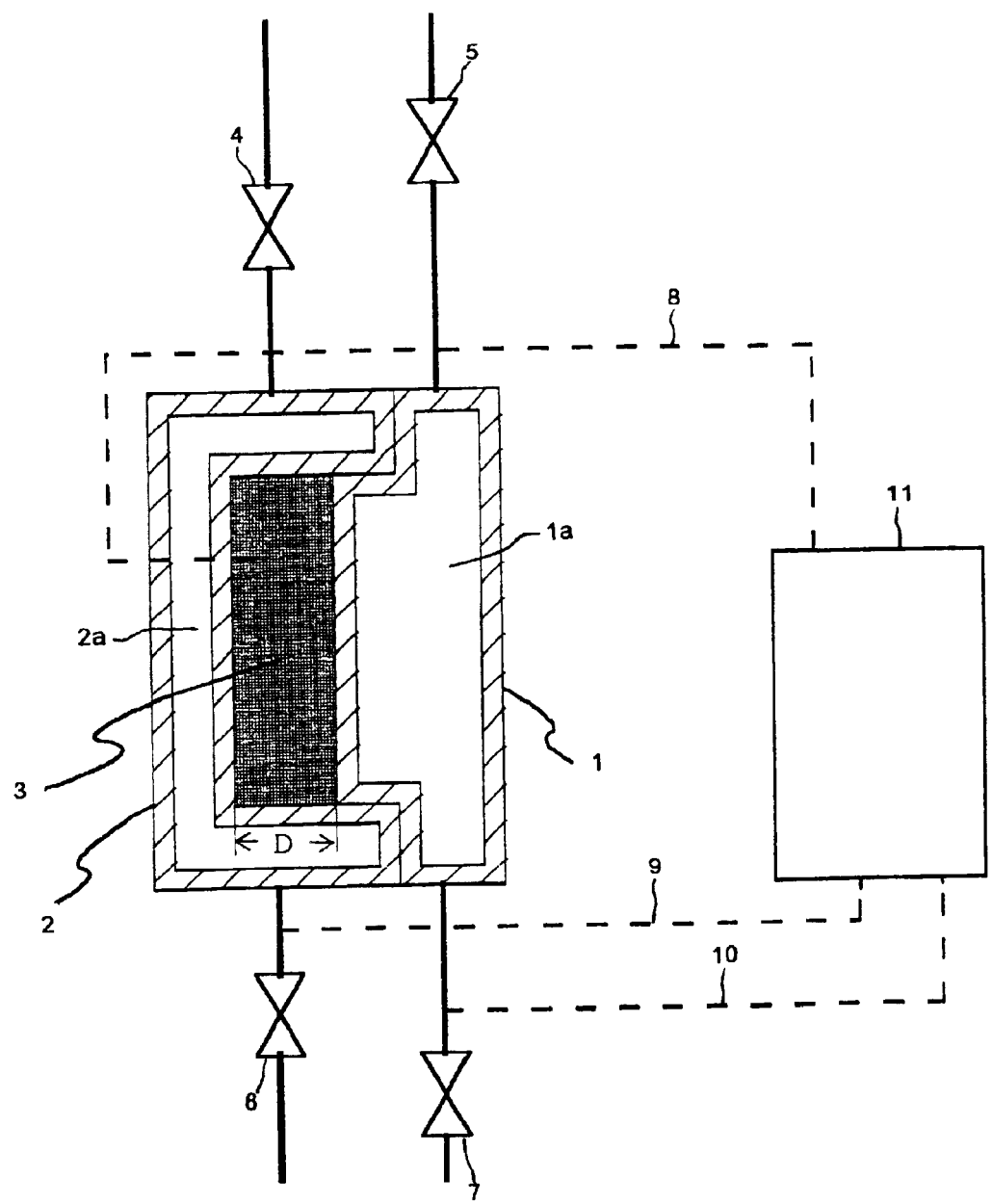
FIG. 4 is a schematic illustration of a molding device used in Example 9.

The molding device had a male mold 1 and a female mold 2 adapted to be displaced relative to each other. When the molds 1 and 2 are located in a fully closed position as shown in FIG. 4, a mold cavity 3 having a size of 250 mm×200 mm×50 mm was defined therebetween. The distance between the opposing inside walls of the molds 1 and 2, which is indicated as "D" in FIG. 4, provides a thickness of a molding produced in the mold cavity 3 and equals 50 mm in the state shown in FIG. 4. After closing the molds 1 and 2 and drain valves 6 and 7, steam was fed for 5 seconds through feed valves 4 and 5 each having a Cv value (indicative of flow rate characteristics thereof) of 18 and an effective cross-sectional area of 320 mm² to warm up the molds. The mold 1 was then displaced relative to the mold 2 through a length of 1 mm (D was increased to 51 mm). Expanded PP beads were fed to the mold cavity 3 and, thereafter, the molds 1 and 2 were closed again. While maintaining each of the drain valves 6 and 7 in an open state, the feed valves 4 and 5 were opened to feed steam into the mold cavity 3 through plenum chambers 1a and 2a and perforations (not shown) formed in the walls between the plenum chambers 1a and 2a and the mold cavity 3 and to purge the air present between the beads from the cavity 3. The drain valves 6 and 7 were then closed and steam at a pressure of 0.8 MPa(G) was fed through the feed valve 4 to the mold cavity 3 until a pressure lower by 0.04 MPa(G) than a predetermined molding pressure was reached in a pressure detecting line 9 connected to a pressure detecting device 11 (1st heating step). Next, while keeping the drain valves 6 and 7 closed, steam at a pressure of 0.8 MPa(G) was fed through the feed valve 5 to the mold cavity 3 until a pressure lower by 0.02 MPa(G) than the predetermined molding pressure was reached in a pressure detecting line 10 connected to a pressure detecting device 11 (2nd heating step). A total process time in the 1st and 2nd heating steps was 20 seconds. Finally, while keeping the drain valves 6 and 7 closed, steam was fed through the feed valves 4 and 5 to the mold cavity 3 until the predetermined molding pressure was reached in each of the pressure detecting lines 9 and 10 (3rd, substantive heating step). As soon as the predetermined molding pressure was reached, the feed valves 4 and 5 were closed and the drain valves 6 and 7 were opened. The molds were then cooled with water until a surface pressure on the molding of 0.059 MPa(G) was reached in a pressure detecting line 8 connected to a pressure detecting device 11. The molding was taken out of the mold cavity 3, aged at 60° C. for 24 hours and allowed to stand in a chamber at 23° C. for 14 days. Thereafter, physical properties of the molding were measured to give the results shown in Table 3-2.

The above-mentioned predetermined pressure of the saturated steam was the minimum steam pressure $P_{min}$ (MPa(G)) required for properly fuse-bonding the beads to each other and determined by repeatedly producing moldings at various saturated steam pressures increasing from 0.15 MPa(G) to 0.55 MPa(G) at an interval of 0.01 MPa(G). Thus, at a pressure ($P_{min}$–0.01 MPa), the beads were incapable of properly fuse-bond together.

In determining the minimum steam pressure $P_{min}$ required for properly fuse-bonding the beads to each other, whether or not the beads were properly bonded to each other was evaluated as follows: A cut with a depth of 10 mm is formed on one of the two largest sides (250 mm×200 mm) of a sample of PP molding (size: 250 mm×200 mm×50 mm) along a bisecting line perpendicular to the longitudinal direction thereof. The sample is then broken into halves along the cut line by bending. The interface along which the halves have been separated is observed to count a total number C1 of the beads present on the interface and the number C2 of the beads having destroyed cells. When the ratio C2/C1 is at least 0.5, the sample is regarded as having properly fuse-bonded beads. The ratio C2/C1 increases with an increase of the steam pressure. The minimum steam pressure $P_{min}$ is a pressure at which the ratio C2/C1 is at least 0.5. At a pressure of ($P_{min}$–0.01 MPa), however, the ratio C2/C1 is lower than 0.5 and the beads are incapable of properly fuse-bond together.

The minimum steam pressure $P_{min}$ is shown in Table 3-1 and 3-2.

The DSC analysis for the measurement of the physical properties of the polypropylene resin and the expanded PP beads was carried out using Shimadzu Heat Flux Differential Scanning Calorimeter DSC-50 (manufactured by SHIMADZU corporation). Physical properties of the PP moldings are also shown in Tables 3-1 and 3-2.

EXAMPLE 8

100 Parts of polypropylene resin selected from those shown in Table 1 and indicated in Table 3-2 were blended with 0.05 part of zinc borate powder (cell controlling agent) and the blend was kneaded in an extruder and extruded into strands. The strands were immediately introduced in water at 18° C. for quenching. The cooled strands were then cut into particles each having a length/diameter ratio of about 1.0 and a mean weight of 2 mg.

In a 400 liter autoclave, 100 parts of the above resin particles are dispersed in 120 parts of ion-exchanged water at 18° C. (weight ratio of the resin particles to water of 0.83:1) together with 0.005 part of sodium dodecylbenzenesulfonate (surfactant), 0.3 part of kaolin powder (dispersing agent), 0.01 part of aluminum sulfate powder (dispersion enhancing agent), an organic peroxide selected from those shown in Table 2 and indicated in Table 3-2 in an amount shown in Table 3-2. With stirring, the dispersion was heated at an average heating rate of 3° C. per minute to the 1 min half life temperature Tn (92° C.) of the peroxide and maintained at that temperature for 5 minutes to complete the decomposition of the peroxide. In this heating stage, the time for which the dispersion was maintained at a temperature in the range of (Tn−30° C.) to (Tn+30° C.) was 15 minutes. Immediately after the above heat treatment, 100 parts of ion exchange water at 18° C. were added to the dispersion so that the weight ratio of the resin particles to water was reduced to 0.45:1. Then, carbon dioxide (blowing agent) in an amount shown in 3-2 were added to the dispersion. The dispersion in the autoclave was stirred, heated to a temperature lower by 5° C. than the expansion temperature shown in Table 3-2 at an average heating rate of 4° C./min and then maintained at that temperature for 15 min. Thereafter, the temperature was raised to the expansion temperature at an average heating rate of 3° C./min and maintained at that temperature for 15 min. One end of the autoclave was then opened to discharge the dispersion to the atmosphere to obtain expanded PP beads. The discharge was carried out while feeding carbon dioxide gas such that the pressure within the autoclave was maintained at a pressure equal to the pressure in the autoclave immediately before the commencement of the discharge. The expanded PP beads were washed, centrifuged and allowed to stand in the atmosphere at 23° C. for 48 hours for aging. The beads were then measured for heat of fusion of a high temperature peak thereof and melting point and high temperature peaks of surface and insides region thereof. Also measured were MFR and apparent density of the beads. The results are summarized in Table 3-2. The expanded PP beads were found to be substantially non-crosslinked (the boiling xylene insoluble content was 0).

The expanded PP beads thus obtained were placed in a vessel, to which pressurized air was fed so that the inside pressure of the cells of the beads was increased to a pressure shown in Table 3-2. The beads were then molded in the same manner as that in Example 1 to obtain a foamed PP molding having the properties shown in Table 3-2.

EXAMPLE 9

100 Parts of polypropylene resin selected from those shown in Table 1 and indicated in Table 3-2 were blended with 0.05 part of zinc borate powder (cell controlling agent) and the blend was kneaded in an extruder and extruded into strands. The strands were immediately introduced in water at 18° C. for quenching. The cooled strands were then cut into particles each having a length/diameter ratio of about 1.0 and a mean weight of 2 mg.

In a 400 liter autoclave, 100 parts of the above resin particles are dispersed in 120 parts of ion-exchanged water at 18° C. (weight ratio of the resin particles to water of 0.83:1) together with 0.005 part of sodium dodecylbenzenesulfonate (surfactant), 0.4 part of kaolin powder (dispersing agent), 0.013 part of aluminum sulfate powder (dispersion enhancing agent), an organic peroxide selected from those shown in Table 2 and indicated in Table 3-2 in an amount shown in Table 3-2. With stirring, the dispersion was heated at an average heating rate of 5° C. per minute to 90° C. and maintained at that temperature for 10 minutes to complete the decomposition of the peroxide. In this heating stage, the time for which the dispersion was maintained at a temperature in the range of (Tn−30° C.) to (Tn+30° C.) was 15 minutes. Immediately after the above heat treatment, 100 parts of ion exchange water at 18° C. were added to the dispersion so that the weight ratio of the resin particles to water was reduced to 0.45:1. Then, a high pressure carbon dioxide gas (blowing agent) was charged in the autoclave until the inside pressure thereof was stabilized at 0.49 MPa(G). The dispersion in the autoclave was then stirred, heated to a. temperature lower by 5° C. than the expansion temperature shown in Table 3-2 at an average heating rate of 5° C./min and maintained at that temperature for 15 min. Thereafter, the temperature was raised to a temperature lower by 1° C. than the expansion temperature at an average heating rate of 0.16° C./min. Subsequently, while a high pressure carbon dioxide gas (blowing agent) was charged in the autoclave until the inside pressure thereof was stabilized at 1.18 Mpa(G), the temperature was raised to the expansion temperature at an average heating rate of 0.029° C./min. Then, one end of the autoclave was then opened to discharge the dispersion to the atmosphere to obtain expanded PP beads. The discharge was carried out while feeding carbon dioxide gas such that the pressure within the autoclave was maintained at a pressure equal to the pressure in the autoclave immediately before the commencement of the discharge. The expanded PP beads were washed, centrifuged and allowed to stand in the atmosphere at 23° C. for 48 hours for aging. The beads were then measured for heat of fusion of a high temperature peak thereof and melting point and high temperature peaks of surface and insides region thereof. Also measured were MFR and apparent density of the beads. The results are summarized in Table 3-2. The expanded PP beads were found to be substantially non-crosslinked (the boiling xylene insoluble content was 0).

The expanded PP beads thus obtained were placed in an ambient pressure for 48 hours so that the inside pressure of the cells thereof was equal to the ambient pressure. The resulting beads were then molded in the manner shown below using a molding device shown in FIG. 4 to obtain a foamed PP molding having the properties shown in Table 3-2.

The molding device had a male mold 1 and a female mold 2 adapted to be displaced relative to each other. When the molds 1 and 2 are located in a fully closed position as shown in FIG. 4, a mold cavity 3 having a size of 250 mm×200 mm×50 mm was defined therebetween. The distance between the opposing inside walls of the molds 1 and 2, which is indicated as "D" in FIG. 4, provides a thickness of a molding produced in the mold cavity 3 and equals 50 mm in the state shown in FIG. 4. After closing the molds 1 and 2 and drain valves 6 and 7, steam was fed for 5 seconds through feed valves 4 and 5 each having a Cv value (indicative of flow rate characteristics thereof) of 18 and an effective cross-sectional area of 320 mm to warm up the molds. The mold 1 was then displaced relative to the mold 2 through a length of 10 mm (D was increased to 60 mm). Expanded PP beads were fed to the mold cavity 3 and, thereafter, the molds 1 and 2 were closed again. While maintaining each of the drain valves 6 and 7 in an open state, the feed valves 4 and 5 were opened to feed steam into the mold cavity 3 through plenum chambers 1*a* and 2*a* and perforations (not shown) formed in the walls between the plenum chambers 1*a* and 2*a* and the mold cavity 3 and to purge the air present between the beads from the cavity 3. The drain valves 6 and 7 were then closed and steam at a pressure of 0.8 Mpa(G) was fed through the feed valve 4 to the mold cavity 3 until a pressure lower by 0.04 Mpa(G) than a predetermined molding pressure was reached in a pressure detecting line 9 connected to a pressure detecting device 11 (1st heating step). Next, while keeping the drain valves 6 and 7 closed, steam at a pressure of 0.8 Mpa(G) was fed through the feed valve 5 to the mold cavity 3 until a pressure lower by 0.02 Mpa(G) than the predetermined molding pressure was reached in a pressure detecting line 10 connected to a pressure detecting device 11 (2nd heating step). Finally, while keeping the drain valves 6 and 7 closed, steam was fed through the feed valves 4 and 5 to the mold cavity 3 until the predetermined molding pressure was reached in each of the pressure detecting lines 9 and 10 (3rd, substantive heating step). A total process time in the 1st and 2nd heating steps was 12 seconds, while the 3rd step was performed for 19 seconds. After the feed valves 4 and 5 were closed and the drain valves 6 and 7 were opened, the molds were cooled with water until a surface pressure on the molding of 0.059 Mpa(G) was reached in a pressure detecting line 8 connected to a pressure detecting device 11. The molding was taken out of the mold cavity 3, aged at 60° C. for 24 hours and allowed to stand in a chamber at 23° C. for 14 days. Thereafter, physical properties of the molding were measured to give the results shown in Table 3-2.

In the same manner as described above, foamed PP moldings were produced at various saturated steam pressures increasing from 0.15 Mpa(G) to 0.55 Mpa(G) at an interval of 0.01 Mpa(G) to determine the minimum steam pressure $P_{min}$. The $P_{min}$ thus determined is shown in Table 3-2. The data of the apparent density and the compression strength of the PP molding of Example 9 shown in Table 3-2 are those of the foamed PP molding obtained at a steam pressure of 0.41 Mpa(G) rather than those at the minimum steam pressure $P_{min}$. Although the PP molding obtained at the minimum steam pressure $P_{min}$ (0.039 Mpa(G)) shows good adhesion strength, the appearance of the PP molding was not satisfactory in that a number of depressions were formed due to insufficient inflation of the expanded PP beads. With a steam pressure of 0.41 Mpa(G), on the other hand, no such depressions were found and the PP molding had good appearance.

TABLE 3-1

| Example | 1 | 2 | 3 | 4 | 5 | 6 |
|---|---|---|---|---|---|---|
| | Comparative Example | | | | | |
| Resin particles | | | | | | |
| No. | 1 | 1 | 1 | 1 | 1 | 2 |
| MFR (g/10 min) | 10 | 10 | 10 | 10 | 10 | 7 |
| Peroxide | | | | | | |
| No. | 1 | 2 | 2 | 2 | 2 | 2 |
| Amount (part) | 1 | 1 | 1 | 1 | 1 | 1 |
| Expansion temperature (° C.) | 167.0 | 167.0 | 170.0 | 167.0 | 166.0 | 144.5 |
| Amount of carbon dioxide (part) | 3 | 3 | 2.5 | 3 | 5.5 | 6.5 |
| Apparent density of expanded PP beads (g/L) | 87 | 131 | 89 | 87 | 78 | 48 |
| Melt of fusion of high temperature peak (J/g) | | | | | | |
| whole | 29.0 | 51.4 | 27.1 | 44.5 | 47.6 | 12.1 |
| surface region | 25.2 | 39.4 | 21.6 | 33.7 | 34.2 | 9.9 |

TABLE 3-1-continued

| Example | 1 | 2 | 3 | 4 | 5 | 6 |
|---|---|---|---|---|---|---|
| inside region | 32.7 | 55.7 | 29.8 | 50.2 | 58.6 | 13.4 |
| Melting point of expanded PP beads (° C.) | | | | | | |
| surface region | 161.3 | 160.8 | 160.6 | 160.8 | 160.8 | 134.5 |
| inside region | 161.6 | 161.4 | 161.3 | 161.4 | 161.5 | 136.2 |
| MFR of expanded PP beads (g/10 min) | 30 | 23 | 22 | 24 | 23 | 18 |
| Inside pressure of cells (MPa(G)) | 0.23 | 0.29 | 0.16 | 0.29 | 0.35 | 0.12 |
| Minimum steam pressure (MPa(G)) | 0.48 | 0.44 | 0.35 | 0.38 | 0.39 | 0.17 |
| Apparent density of PP molding (g/L) | 55 | 91 | 58 | 53 | 46 | 31 |
| Apparent density of sample (g/L) | 55 | 93 | 58 | 53 | 46 | 31 |
| Compression strength (kPa) | 570 | 1480 | 620 | 650 | 540 | 195 |

TABLE 3-2

| | Example | | | Comparative Example | | | | |
|---|---|---|---|---|---|---|---|---|
| | 7 | 8 | 9 | 1 | 2 | 3 | 4 | 5 |
| Resin particles | | | | | | | | |
| No. | 3 | 1 | 3 | 1 | 1 | 1 | 2 | 3 |
| MFR (g/10 min) | 18 | 10 | 19 | 10 | 11 | 10 | 7 | 18 |
| Peroxide | | | | | | | | |
| No. | 2 | 2 | 2 | — | — | — | — | — |
| Amount (part) | 1 | 0.32 | 0.32 | 0 | 0 | 0 | 0 | 0 |
| Expansion temperature (° C.) | 165.5 | 166.0 | 167.0 | 167.5 | 168.0 | 167.5 | 145.0 | 165.5 |
| Amount of carbon dioxide (part) | 3 | 3 | 1 (*1) | 4.5 | 5 | 5 | 7 | 4 |
| Apparent density of expanded PP beads (g/L) | 85 | 128 | 125 | 131 | 69 | 83 | 48 | 93 |
| Heat of Fusion of high temperature peak (J/g) | | | | | | | | |
| whole | 39.2 | 50.8 | 31.9 | 56.1 | 44.9 | 50.5 | 12.4 | 40.8 |
| surface region | 20.8 | 45.9 | 20.0 | 51.5 | 41.6 | 46.4 | 11.5 | 39.4 |
| inside region | 45.0 | 59.6 | 41.4 | 58.7 | 47.8 | 52.7 | 12.8 | 40.8 |
| Melting point of expanded PP beads (° C.) | | | | | | | | |
| surface region | 160.0 | 160.3 | 160.3 | 162.0 | 161.8 | 161.9 | 136.6 | 161.3 |
| inside region | 160.6 | 161.1 | 160.7 | 161.5 | 161.6 | 161.6 | 136.2 | 160.6 |
| MFR of expanded PP beads (g/10 min) | 34 | 34 | 35 | 10 | 11 | 10 | 7 | 18 |
| Inside pressure of cells (MPa(G)) | 0.19 | 0.31 | 0 | 0.29 | 0.35 | 0.29 | 0.12 | 0.50 |
| Minimum steam pressure (MPa(G)) | 0.36 | 0.44 | 0.39 | 0.55 | 0.55 | 0.55 | 0.22 | 0.55 |
| Apparent density of PP molding (g/L) | 54 | 90 | 91 | 91 | 46 | 54 | 31 | 61 |
| Apparent density of sample (g/L) | 53 | 92 | 93 | 91 | 46 | 54 | 31 | 61 |
| Compression strength (kPa) | 640 | 1460 | 1410 | 1359 | 510 | 650 | 195 | 790 |

*1: inferred value based on experience

In Tables 3-1 and 3-2, the apparent density (g/L) of the expanded PP beads is measured as follows. From the expanded PP beads which have been subjected to the aging, a quantity (0.5 to 10 g and 50 to 90 cm$^3$) of the beads are arbitrarily selected. After the weight Wa (g) of the selected beads is measured, the beads are immersed in 100 ml of water contained in a graduated measuring cylinder. From the volume increment, apparent volume Va (L) of the beads is determined. The apparent density (g/L) is calculated by dividing the weight Wa (g) of the beads by the apparent volume Va (L) of the beads. In Table 3-1 and 3-2, the symbol "(G)" is affixed to MPa to show that the pressure concerned is a gauge pressure.

In Comparative Examples 1–3 and 5, even when the maximum allowable pressure (0.55 Mpa(g)) of the molding device was used, the C2/C1 ratios were 0, 0.16, 0.12 and 0.30, respectively, and lower than 0.5. A higher pressure steam was thus needed to obtain PP moldings having properly fuse-bonded beads.

In Tables 3-1 and 3-2, the compression strength was measured as follows. A PP molding was cut without leaving any outer surfaces thereof to obtain a sample having a size of 50 mm×50 mm×25 mm. The sample was subjected to compression test in accordance with Japanese Industrial Standard JIS Z0234-1976, A method. Thus, the sample was compressed at 23° C. at a loading rate of 10 mm/min until a strain of 55% was reached to obtain a stress-strain curve. The stress at 50% strain represents the compression strength.

From the results shown in Tables 3-1 and 3-2, it is seen that the expanded PP beads obtained from surface-modified propylene resin particles give PP moldings having good recyclability and high mechanical strength at a relatively low molding temperature.

In particular, comparison of Example 2 with Comparative Example 1 shows that they are almost the same with respect to the apparent density of expanded PP beads, the heat of fusion of whole expanded PP bead, the apparent density of PP molding, and the apparent density of a PP molding cut sample. However, the minimum pressure required for properly fuse-bonding the beads to each other is more than 0.55 Mpa(G) in Comparative Example 1 and 0.44 MPa(G) in the case of Example 2, indicating that the minimum temperature required for fuse-bonding the expanded PP beads of Example 2 is lower by at least 7° C. than that of Comparative Example 1. Yet, the mechanical strengths of the PP molding of Example 2 are comparable to those of Comparative Example 1, as expected from the similar heat of fusion of the high temperature peaks of the expanded PP beads of Comparative Example 1 and Example 2.

Comparison of Example 4 with Comparative Example 3 shows that they are almost the same with respect to the apparent density of expanded PP beads, the heat of fusion of whole expanded PP bead, the apparent density of PP molding, and the apparent density of a PP molding cut sample. However, the minimum pressure required for properly fuse-bonding the beads to each other is more than 0.55 Mpa(G) in Comparative Example 3 and 0.38 Mpa(G) in the case of Example 4, indicating that the minimum temperature required for fuse-bonding of the expanded PP beads of Example 4 is lower by at least 12° C. than that of Comparative Example 3. Yet, the mechanical strengths of the PP molding of Example 4 are comparable to those of Comparative Example 3, as expected from the similar heat of fusion of the high temperature peaks of the expanded PP beads of Comparative Example 3 and Example 4.

Comparison of Example 5 with Comparative Example 2 shows that they are almost the same with respect to the apparent density of expanded PP beads, the heat of fusion of whole expanded PP bead, the apparent density of PP molding, and the apparent density of a PP molding cut sample. However, the minimum pressure required for properly fuse-bonding the beads to each other is more than 0.55 Mpa(G) in Comparative Example 2 and 0.39 Mpa(G) in the case of Example 5, indicating that the minimum temperature required for fuse-bonding of the expanded PP beads of Example 5 is lower by at least 11° C. than that of Comparative Example 2. Yet, the mechanical strengths of the PP molding of Example 5 are comparable to those of Comparative Example 2, as expected from the similar heat of fusion of the high temperature peaks of the expanded PP beads of Comparative Example 2 and Example 5.

Comparison of Example 6 with Comparative Example 4 shows that they are almost the same with respect to the apparent density of expanded PP beads, the heat of fusion of whole expanded PP bead, the apparent density of PP molding, and the apparent density of a PP molding cut sample. However, the minimum pressure required for properly fuse-bonding the beads to each other is 0.22 MPa(G) in Comparative Example 4 and 0.17 Mpa(G) in the case of Example 6, indicating that the minimum temperature required for fuse-bonding of the expanded PP beads of Example 6 is lower by at least 6° C. than that of Comparative Example 4. Yet, the mechanical strengths of the PP molding of Example 6 are comparable to those of Comparative Example 4, as expected from the similar heat of fusion of the high temperature peaks of the expanded PP beads of Comparative Example 4 and Example 6.

Comparison of Example 1 with Example 3 shows that they are almost the same with respect to the apparent density of expanded PP beads, the heat of fusion of whole expanded PP bead, the apparent density of PP molding, and the apparent density of a PP molding cut sample. However, the minimum pressure required for properly fuse-bonding the beads to each other is 0.48 Mpa(G) in Example 1 and 0.35 Mpa(G) in the case of Example 3, indicating that the minimum temperature required for fuse-bonding of the expanded PP beads of Example 3 is lower by 9° C. than that of Example 1. Significant difference in the method of production of expanded PP beads between Examples 1 and 3 is that Example 3 uses a carbonate as an organic peroxide. Thus, the use of a carbonate is desirable for reasons of reduction of minimum temperature for fuse-bonding the expanded PP beads.

Comparison of Example 7 with Comparative Example 5 shows that they are almost the same with respect to the apparent density of expanded PP beads and the heat of fusion of whole expanded PP bead. Though these examples differ in the apparent density of PP molding and the apparent density of a PP molding cut sample, such a difference would not hinder fair comparison with respect to minimum pressure required for properly fuse-bonding the beads to each other. Thus, the minimum pressure is more than 0.55 Mpa (G) in Comparative Example 5 and 0.36 Mpa(G) in the case of Example 7, indicating that the minimum temperature required for fuse-bonding of the expanded PP beads of Example 7 is lower by at least 13° C. than that of Comparative Example 5. Higher mechanical strengths of the PP molding of Comparative Example 5 are as expected from the higher heat of fusion of the high temperature peak of the expanded PP beads of Comparative Example 5 and greater apparent density of the PP molding of Comparative Example 5 as compared with those of Example 7.

Figure 3:
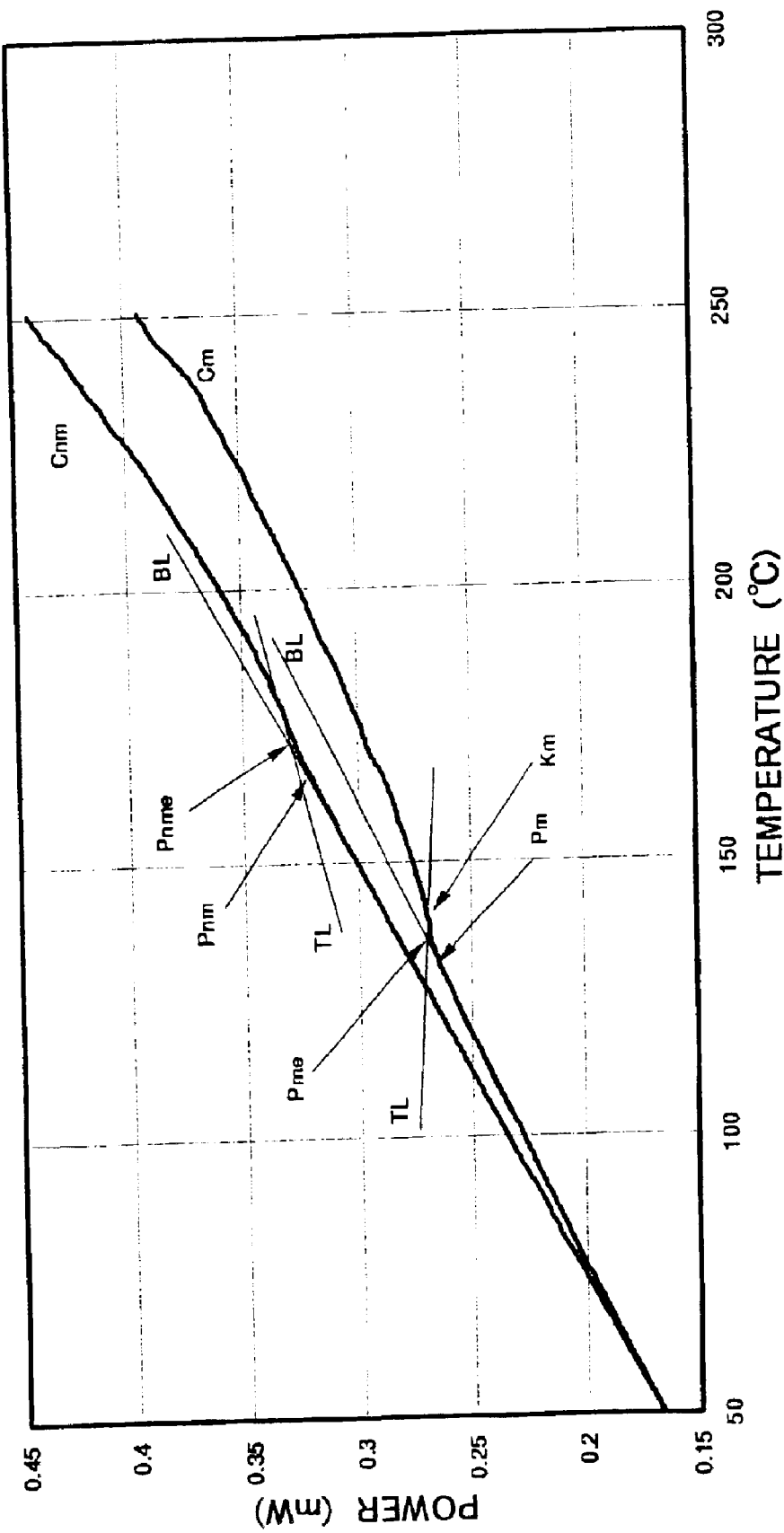
FIG. 3 shows PDTA curves obtained by micro differential thermoanalysis of surfaces of expanded PP beads obtained in Example 7 and Comparative Example 5.

The micro differential thermoanalysis ($\mu$DTA) of the expanded PP beads obtained in Example 7 and Comparative Example 5 was performed using a micro differential thermoanalysis system ("Type 2990 Micro Thermal Analyzer" of T. A. Instrument, Japan Inc.) at a heating rate of 10° C./sec from 25° C. to 200° C. Such $\mu$DTA curves are shown in FIG. 3. It was found that the melt initiation temperature Pm and the extrapolated melt initiation temperature Pme were about 131° C. and about 135° C., respectively, in the case of the expanded PP beads of Example 7, whereas the melt initiation temperature Pnm and the extrapolated melt initiation temperature Pnme were about 168° C. and about 171° C., respectively, in Comparative Example 5.

Thus, the low melt initiation temperature or the low extrapolated melt initiation temperature is considered to contribute the reduction of the minimum temperature required for fuse-bonding the expanded PP beads of Example 7.

As compared with Example 2 in which the surface modification is carried out with the weight ratio of the resin particles to the dispersing medium (water) of 0.45, Example 8 in which the particle/water ratio is 0.83 gives similar results in spite of the fact that the organic peroxide is used in less amount (0.32 part) in Example 8 than that in Example 2 (1 part). In this connection, the advantage attained in Example 8 is apparent in view of the fact that the apparent density, heat of fusion (entire) and inside pressure of cells of the expanded PP beads of Examples 2 and 8 are similar and that the apparent density of the PP molding and the cut sample thereof in Examples 2 and 8 are similar.

In Example 9, the PP molding is prepared from expanded PP beads whose inside pressure is equal to the ambient pressure. Such expanded beads would require the use of much higher temperature steam in order to obtain a PP molding having good fusion between beads and good appearance as compared with expanded beads whose cells have an increased inside pressure. By increasing the amount of the expanded beads filled in the mold cavity and by adopting a three-step molding process in which the 1st and 2nd heating steps are conducted for a relatively short period of time and the 3rd, substantive heating step is carried out for a relatively long period of time, the PP molding obtained shows both good adhesion between beads and good appearance even at a low steam pressure of 0.41 MPa. The melt initiation temperature Pm and the extrapolated melt initiation temperature Pme were found to be about 140° C. and about 142° C., respectively, As described previously, a PP molding is regarded as having properly fuse-bonded beads, when the ratio C2/C1 is at least 0.5. Table 4 shows relationships between C2/C1 ratios of PP moldings and saturated steam pressures used for molding. As will be appreciated from the results shown in Table 4, a slight increase in saturated steam pressure results in an increase of the C2/C1 ratio, namely increase of the bonding force between beads. A greater C2/C1 ratio is desirable because the PP molding has a higher resistance to fracture upon being bent.

TABLE 4

| Example No. | Saturated Steam Pressure (MPa(G)) | C2/C1 Ratio |
|---|---|---|
| Example 1 | 0.48 | 0.51 |
|  | 0.49 | 0.65 |
| Example 2 | 0.44 | 0.50 |
|  | 0.45 | 0.63 |
| Example 3 | 0.35 | 0.52 |
|  | 0.37 | 0.80 |
| Example 4 | 0.38 | 0.50 |
|  | 0.39 | 0.60 |
| Example 5 | 0.39 | 0.53 |
|  | 0.41 | 0.66 |
| Example 6 | 0.17 | 0.60 |
|  | 0.18 | 0.75 |
| Example 7 | 0.36 | 0.54 |
|  | 0.37 | 0.60 |
| Example 8 | 0.44 | 0.56 |
|  | 0.45 | 0.70 |
| Example 9 | 0.39 | 0.60 |
|  | 0.41 | 0.83 |
| Comparative Example 4 | 0.22 | 0.55 |
|  | 0.23 | 0.62 |

In one aspect, the present invention provides a process for the production of a foam PP molding, in which novel expanded PP beads whose surfaces have been modified with an organic peroxide are filled in a mold cavity and heated to be fuse-bonded together. The molding can be carried out at a significantly reduced temperature as compared with the conventional expanded PP beads. Thus, the process of the present invention can save consumption of thermal energy, reduce the cooling time and improve the productivity. The PP molding produced is substantially non-crosslinked and has good recyclability.

Hitherto, expanded PP beads showing a high temperature endothermic peak in DSC curve thereof having high heat of fusion have been used for obtaining high rigidity, high impact strength PP moldings. In this case, a high molding temperature must be unavoidably employed and, hence, a general type molding machine designed to be used at usual pressure cannot be used. In contrast, according to the present invention, even when the expanded PP beads used are made of a high melting point polypropylene resin and have high heat of fusion of high temperature endothermic peak, the foamed PP molding having high rigidity can be obtained using a low pressure steam (low temperature steam). This permits the use of the conventional general-type molding machine. Namely, the process of the present invention can produce PP moldings having high mechanical strengths and/or light weight at lower costs.

The foamed PP moldings of the present invention may be suitably used for various applications. For example, they may be utilized as automobile exterior components such as bumper core materials, spoilers, body side ornaments, license plate housings, mirror housings, air dam skirts and mud guards; and automobile interior components such as door trims, instrument panels, console boxes, console lids, glove boxes, pillar trims, arm rests, head rests, sun visors, rear end panels, trunk room trims, trunk lid trims, boxes for containing air bags, seat belt buckles, head liners, steering wheel covers, cushioning materials for side doors, ceiling liners and head protectors for occupants.

In the case of the automobile interior components, outer surfaces of the foamed PP moldings may be ornamented by uneven surface design (e.g. embossment or textile-like decoration), printing or dyeing. Alternatively, a skin layer may be combined with or bonded to the foamed PP moldings to provide a surface decorative layer of the automobile interior component.

The foamed PP moldings of the present invention may be also used as heat resistant containers, tote boxes, pallets, helmet core materials, patterns for a full mold process, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the preparation of expanded polypropylene resin beads, comprising the steps of:
    (a) dispersing substantially non-crosslinked polypropylene resin particles in a dispersing medium containing an organic peroxide to obtain a dispersion;
    (b) maintaining said dispersion at a temperature lower than the melting point of said polypropylene resin but sufficient to decompose said organic peroxide, thereby obtaining substantially non-crosslinked, surface-modified polypropylene resin particles; and
    (c) expanding said non-crosslinked, surface-modified polypropylene resin particles using a blowing agent to obtain expanded, substantially non-crosslinked polypropylene resin beads.

2. A process as claimed in claim 1, wherein, in step (b), said dispersion is maintained at a temperature not lower than the glass transition point but not higher than the Vicat softening point of said polypropylene resin.

3. A process as claimed in claim 1, wherein said blowing agent is a physical blowing agent.

4. A process as claimed in claim 3, wherein said physical blowing agent comprises at least one inorganic blowing agent selected from the group consisting of nitrogen, oxygen, carbon dioxide and water.

5. A process as claimed in claim 1, wherein step (c) is performed so that the expanded polypropylene resin beads have an apparent density of 10 g/L to 500 g/L and a high temperature endothermic peak, in a DSC curve thereof, in addition to an intrinsic endothermic peak located at a lower temperature side of said high temperature peak.

6. A process as claimed in claim 5, wherein said high temperature endothermic peak has an area corresponding to a calorific value in the range of 2–70 J/g.

7. A process as claimed in claim 1, wherein the expanded polypropylene resin beads have a MFR value which is not smaller than that of the non-crosslinked polypropylene resin particles before step (b) and which is in the range of 0.5–150 g/10 min.

8. A process as claimed in claim 1, wherein a surface region of the expanded polypropylene resin bead has a melting point lower than that of an inside region thereof.

9. A process as claimed in claim 1, wherein each of said expanded polypropylene resin beads has a surface region and an inside region, wherein each of said surface and inside regions shows a high temperature endothermic peak, in a DSC curve thereof, in addition to an intrinsic endothermic peak located at a lower temperature side of said high temperature peak, and wherein said high temperature endothermic peaks of said surface region and said inside region have areas that correspond to calorific values of Hs and Hi, respectively, and wherein Hs and Hi have the following relationship:

$$Hs < 0.86 \times Hi$$

10. A process as claimed in claim 1, wherein said organic peroxide generates oxygen radicals when decomposed.

11. A process as claimed in claim 1, wherein said organic peroxide is a substance half the amount of which decomposes when maintained for 1 hour at a temperature Th and wherein Th is not lower than the glass transition point but not higher than the Vicat softening point of said polypropylene resin.

12. A process as claimed in claim 10, wherein said organic peroxide is a carbonate.

13. A process as claimed in claim 1 wherein said polypropylene resin particles dispersed in step (a) and said expanded polypropylene resin beads have a degree of crosslinking of 5% or less.

14. A process as claimed in claim 1 wherein said polypropylene resin particles dispersed in step (a) and said expanded polypropylene resin beads have a degree of crosslinking of 3% or less.

15. A process as claimed in claim 1 wherein said polypropylene resin particles dispersed in step (a) and said expanded polypropylene resin beads have a degree of crosslinking of 1% or less.

16. A process as claimed in claim 8 wherein the melting point of the surface region is at least 0.3° C. lower than the melting point of the inside region.

17. A process as claimed in claim 16 wherein said polypropylene resin particles dispersed in step (a) and said expanded polypropylene resin beads have a degree of crosslinking of 5% or less.

18. A process as claimed in claim 1 wherein the surface-modified propylene resin particles have a surface region and an interior region and wherein the surface region has a greater oxygen content per unit weight than that of the interior region.

19. A process as claimed in claim 8 wherein the surface region has a greater oxygen content per unit weight than the inside region.

20. A process as claimed in claim 16 wherein the surface region has a greater oxygen content per unit weight than the inside region.

21. A process as claimed in claim 1 wherein the decomposed organic peroxide attacks only a surface region of the polypropylene resin particles but not an inside region of the polypropylene particles.

22. A process for the preparation of expanded resin beads, comprising the steps of:
(a) dispersing substantially non-crosslinked particles of a base resin including a polypropylene resin in a dispersing medium containing an organic peroxide to obtain a dispersion;
(b) maintaining said dispersion at a temperature lower than the melting point of said base resin but sufficient to decompose said organic peroxide, thereby obtaining substantially non-crosslinked, surface-modified resin particles; and
(c) expanding said non-crosslinked, surface-modified resin particles using a blowing agent to obtain expanded, substantially non-crosslinked resin beads.

23. A process as claimed in claim 22, wherein, in step (b), said dispersion is maintained at a temperature not lower than the glass transition point but not higher than the Vicat softening point of said base resin.

24. A process as claimed in claim 22, wherein said blowing agent is a physical blowing agent.

25. A process as claimed in claim 24, wherein said physical blowing agent comprises at least one inorganic blowing agent selected from the group consisting of nitrogen, oxygen, carbon dioxide and water.

26. A process as claimed in claim 22, wherein step (c) is performed so that the expanded resin beads have an apparent density of 10 g/L to 500 g/L and a high temperature endothermic peak, in a DSC curve thereof, in addition to an intrinsic endothermic peak located at a lower temperature side of said high temperature peak.

27. A process as claimed in claim 26, wherein said high temperature endothermic peak has an area corresponding to a calorific value in the range of 2–70 J/g.

28. A process as claimed in claim 22, wherein the expanded resin beads have an MFR value which is not smaller than that of the non-crosslinked resin particles before step (b) and which is in the range of 0.5–150 g/10 min.

29. A process as claimed in claim 22, wherein a surface region of the expanded resin bead has a melting point lower than that of an inside region thereof.

30. A process as claimed in claim 22, wherein each of said expanded resin beads has a surface region and an inside region, wherein each of said surface and inside regions shows a high temperature endothermic peak, in a DSC curve thereof, in addition to an intrinsic endothermic peak located at a lower temperature side of said high temperature peak, and wherein said high temperature endothermic peaks of said surface region and said inside region have areas that correspond to calorific values of Hs and Hi, respectively, and wherein Hs and Hi have the following relationship:

$$Hs < 0.86 \times Hi$$

31. A process as claimed in claim 22, wherein said organic peroxide generates oxygen radicals when decomposed.

32. A process as claimed in claim 22, wherein said organic peroxide is a substance half the amount of which decomposes when maintained for 1 hour at a temperature Th and wherein Th is not lower than the glass transition point but not higher than the Vicat softening point of said base resin.

33. A process as claimed in claim 31, wherein said organic peroxide is a carbonate.

34. A process as claimed in claim 22 wherein said base resin particles dispersed in step (a) and said expanded resin beads have a degree of crosslinking of 5% or less.

35. A process claimed in claim 22, wherein said base resin particles dispersed in step (a) and said expanded resin beads have a degree of crosslinking of 3% or less.

36. A process as claimed in claim 22, wherein said base resin particles dispersed in step (a) and said expanded resin beads have a degree of crosslinking of 1% or less.

37. A process as claimed in claim 29 wherein the melting point of the surface region is at least 0.3° C. lower than the melting point of the inside region.

38. A process as claimed in claim 37 wherein said base resin particles dispersed in step (a) and said expanded resin beads have a degree of crosslinking of 5% or less.

39. A process as claimed in claim 22 wherein the surface-modified resin particles have a surface region and an interior region and wherein the surface region has a greater oxygen content per unit weight than that of the interior region.

40. A process as claimed in claim 29 wherein the surface region has a greater oxygen content per unit weight than the inside region.

41. A process as claimed in claim 37 wherein the surface region has a greater oxygen content per unit weight than the inside region.

42. A process as claimed in claim 22, wherein the decomposed organic peroxide attacks only a surface region of the base resin particles but not an inside region of the base resin particles.

* * * * *